(12) United States Patent
Dube et al.

(10) Patent No.: US 8,925,701 B1
(45) Date of Patent: Jan. 6, 2015

(54) CLUTCH BY-WIRE

(71) Applicants: Alisa Michnik Dube, West Chester, PA (US); Yefim Michnik, Cherry Hill, NJ (US)

(72) Inventors: Alisa Michnik Dube, West Chester, PA (US); Yefim Michnik, Cherry Hill, NJ (US)

( * ) Notice: Subject to any disclaimer, the term of this patent is extended or adjusted under 35 U.S.C. 154(b) by 108 days.

(21) Appl. No.: 13/913,460

(22) Filed: Jun. 9, 2013

(51) Int. Cl.
*F16D 21/02* (2006.01)
*F16D 27/12* (2006.01)
*F16D 27/14* (2006.01)

(52) U.S. Cl.
CPC ...................................... *F16D 27/14* (2013.01)
USPC ......... 192/3.51; 74/354; 74/665 GA; 192/48.2

(58) Field of Classification Search
CPC ................................. F16D 21/02; F16D 27/12
USPC ......... 192/3.56, 48.2; 74/15.2, 352, 353, 354, 74/665 N
See application file for complete search history.

(56) References Cited

U.S. PATENT DOCUMENTS

| | | | |
|---|---|---|---|
| 3,686,974 A * | 8/1972 | Little, Jr. .................. | 74/665 GA |
| 4,114,834 A | 9/1978 | Haake | |
| 4,444,298 A * | 4/1984 | Stangroom .................. | 192/48.2 |
| 5,009,296 A * | 4/1991 | Ohkawa et al. .............. | 192/48.2 |
| 5,764,372 A | 6/1998 | Kondo | |

* cited by examiner

*Primary Examiner* — Rodney H Bonck

(57) ABSTRACT

A clutch by-wire capable of switching any number of clutch circuits and is capable of distributing rotary movement of a single rotary source simultaneously to any combination of the clutch circuits without stopping the rotary source, where a direction of rotary movement received by any of the clutch circuits does not depend on directions of rotary movements received by the other clutch circuits of the combination.

5 Claims, 39 Drawing Sheets

CLUTCH BY-WIRE

BACKGROUND OF THE INVENTION

1. Field of the Invention

The present invention relates to controlled by-wire devices comprising a plurality of independent mechanical circuits, where specifically, a uniform way is desired for achieving a desired number of independent mechanical circuits regardless of an application and for engaging, at minimum, any independent mechanical circuit and, at maximum, for engaging simultaneously any combination of independent mechanical circuits regardless of a number of independent mechanical circuits, wherein each independent mechanical circuit is a mechanical circuit which is capable of receiving rotary movement regardless of other independent mechanical circuits.

2. Background of the Invention

The present invention is a clutch by-wire which can be used in any device requiring a plurality of independent mechanical circuits described there above, for instance, such as robotics, car power seats, etc., wherein independent mechanical circuits dedicated by a designer of an application for switching by the clutch by-wire are defined hereinafter as clutch circuits.

There are designs in prior art for engaging multiple independent mechanical circuits. However, these designs are solutions for specific applications, for instance, U.S. Pat. No. 4,114,834 issued on Sep. 19, 1978 to Haake discloses a tape drive system and one-way clutch mechanism; and U.S. Pat. No. 5,764,372 issued on Jun. 9, 1998 to Kondo discloses a facsimile machine with a mechanism capable of transmitting power from a single motor to two independent mechanical circuits, where it is not clear, if possible at all, how to apply these designs to other applications requiring a larger number of independent mechanical circuits.

Consequently, there is a need for a universal solution which will provide for switching regardless of a number of independent mechanical circuits and regardless of an application.

There has been no prior art found addressing this task.

OBJECTS OF THE INVENTION

Accordingly, several objects and advantages of the present invention are:

To provide a universal approach for achieving a desired number of clutch circuits regardless of an application.

To provide a universal approach for engaging any combination of clutch circuits simultaneously regardless of a number thereof.

To provide a reliable, space efficient, and cost effective device due to an ability to minimize hardware, for instance, by utilizing only one rotary source, if desired.

To provide a time saving device permitting to engage and to disengage any combination of clutch circuits without stopping a rotary source.

To provide a convenient device, yet even more cost efficient device, as an off-the-shelf solution for any kind of applications.

Further objects and advantages of this invention will become apparent from a consideration of the drawings and ensuing description.

SUMMARY OF THE INVENTION

The present invention may be generally described as a clutch comprising at least one rotary source for providing incoming rotary movement thereto according to a predetermined algorithm executable by a controller, a plurality of clutch circuits arranged around, and equidistantly from, a predetermined rotational axis, and at least one actuating device controllable according to the algorithm and capable of rotating around the rotary axis for aligning with any clutch circuit. Each clutch circuit is a mechanical rotary circuit capable of utilizing rotary movement for performing a predetermined function of an application. Each actuating device is also capable of changing a selection status of any clutch circuit aligned therewith, wherein each clutch circuit is preconfigured for receiving the incoming rotary movement when selected and for not receiving the incoming rotary movement when deselected; therefore, a single actuating device is sufficient for selecting at least any one of the clutch circuits regardless of a total number of the clutch circuits; and if each clutch circuit is capable of remaining in a selection status, a single actuating device is further capable of selecting any combination of the clutch circuits for receiving the incoming rotary movement simultaneously regardless of a total number of the clutch circuits.

The features briefly described in this summary as well as other features and advantages of this invention will become apparent to those skilled in the art upon review of the following drawings, the detailed description, and the appended claims.

DETAILED DESCRIPTION OF THE INVENTION

Figure 1:
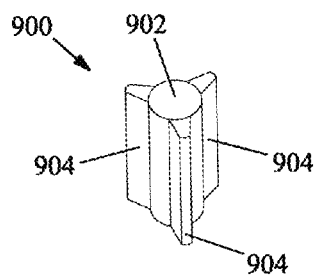
FIG. 1 is a partial perspective view of a three-rib section.
Figure 2:
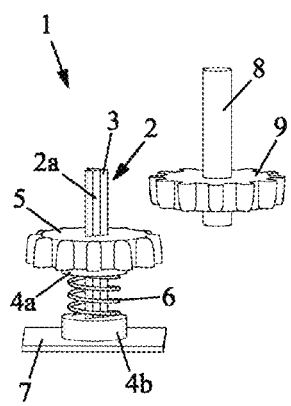
FIG. 2 is a partial perspective view of a gear not engaged with a gear of a buffer assembly.

FIG. 1 depicts a three-rib section 900. Multiple instances of three-rib section 900 are used in some of the demonstrated embodiments. Three-rib section 900 comprises a rotational axis 902 comprising three ribs 904 positioned along rotational axis 902 and equidistantly located from each other around rotational axis 902.

FIGS. 2-6 depict a buffer assembly 1. Multiple instances of buffer assembly 1 are used in some of the demonstrated embodiments. Buffer assembly 1 comprises three-rib section 2 (identical to three-rib section 900) comprising a rotational axis 2a comprising three ribs 3 (best seen in FIGS. 5 and 6), a ball bearing 4a, a ball bearing 4b, a gear 5, compression spring 6, and encasing 7 (shown partially). Ball bearing 4b is mounted to encasing 7 via its outer race. Rotational axis 2a is mounted to the inner race of ball bearing 4b. Ball bearing 4a is mounted on rotational axis 2a via its inner race movable along ribs 3. Gear 5 is attached to the inner race of ball bearing 4a and movable with the inner race along ribs 3. A compression spring 6 is mounted to the outer race of ball bearing 4a with one end and to the outer race of ball bearing 4b with the other end for isolating spring 6 from the rotational movement of rotational axis 2a via ball bearings 4a and 4b.

Figure 3:
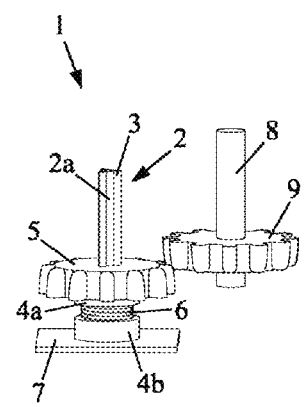
FIG. 3 is a partial perspective view of a gear partially engaged with a gear of a buffer assembly.
Figure 4:
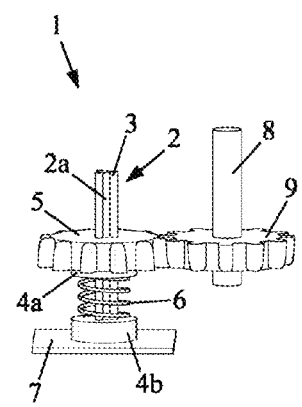
FIG. 4 is a partial perspective view of a gear fully engaged with a gear of a buffer assembly.
Figure 5:
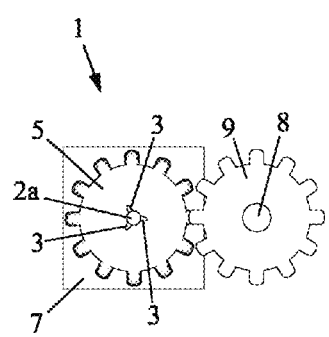
FIG. 5 is a partial top view of a gear partially engaged with a gear of a buffer assembly.
Figure 6:
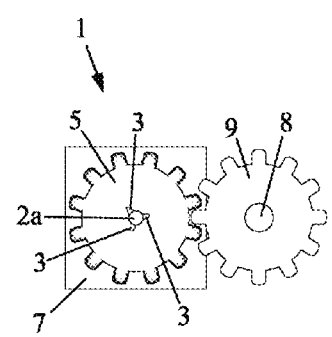
FIG. 6 is a partial top view of a gear fully engaged with a gear of a buffer assembly.
Figure 7:
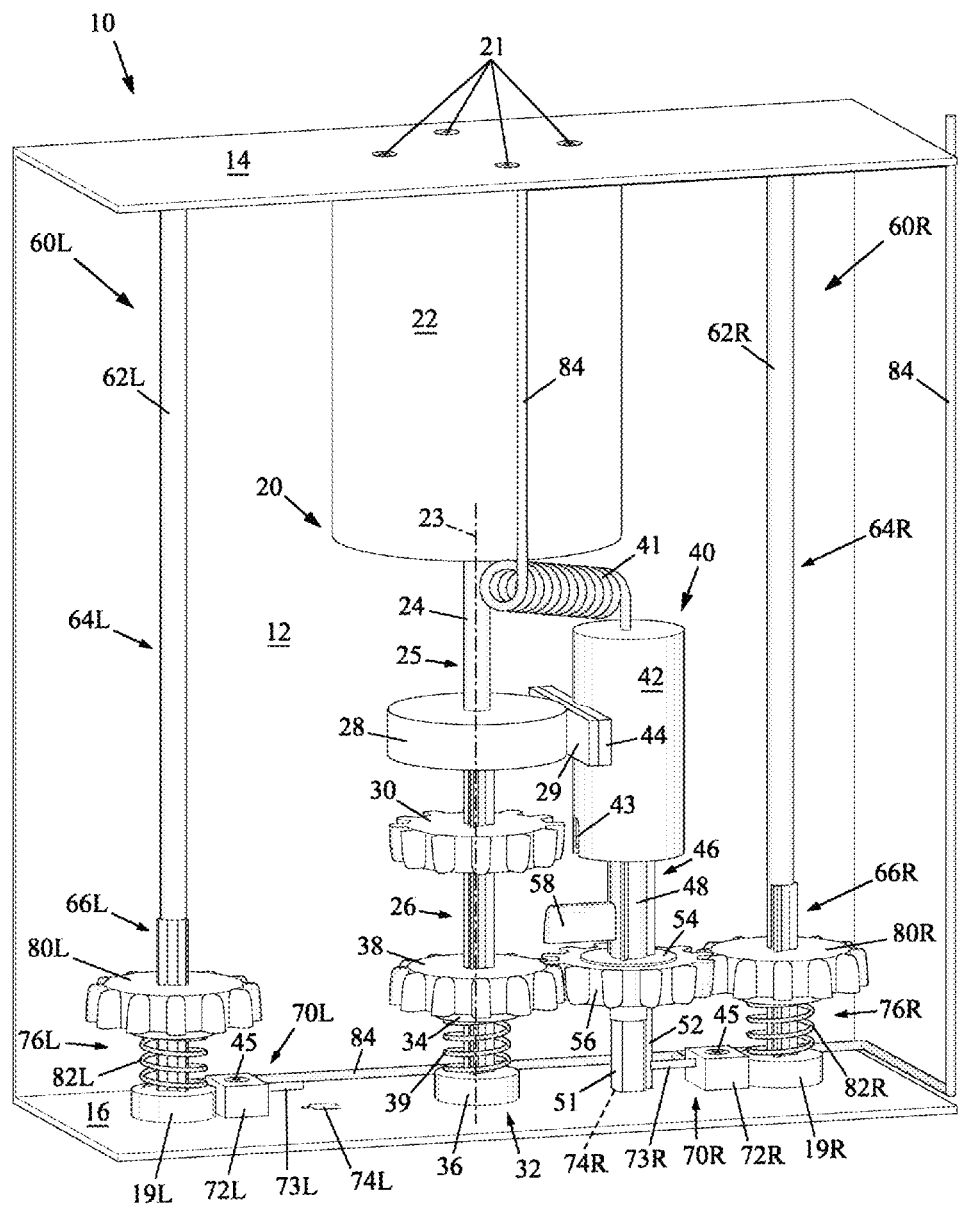
FIG. 7 is a perspective view of a clutch by-wire sample embodiment with one solenoid and two clutch circuits showing the solenoid engaged with the right clutch circuit.
Figure 8:
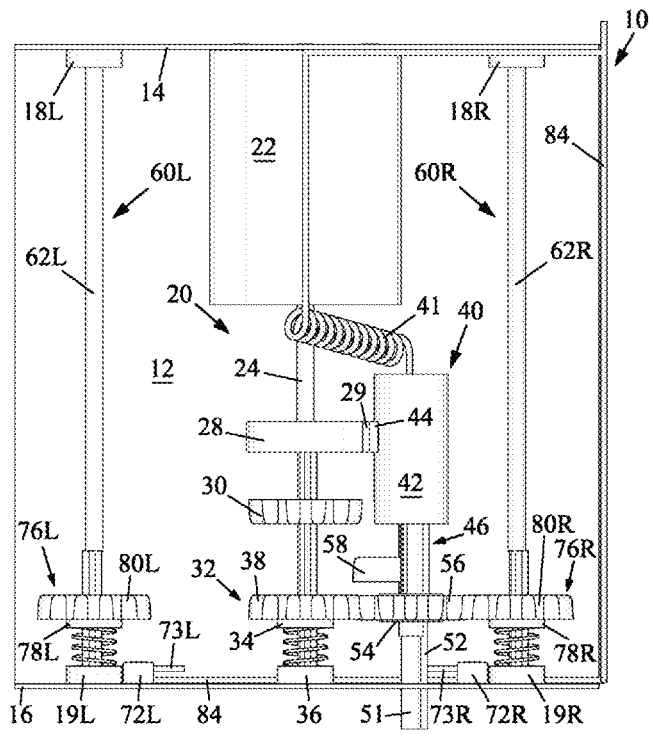
FIG. 8 is a front view of the clutch by-wire sample embodiment depicted in FIG. 7.

Buffer assembly 1 is used to buffer the force of initial engagement of a gear 9 mounted on an axis 8 and adapted to engage with gear 5. In operation, when gear 9 is moved toward gear 5, for instance, by a solenoid (not shown) and can not fully engage with gear 5, it pushes gear 5 and ball bearing 4a along the rotational axis 2a compressing spring 6 (FIGS. 3 and 5). At this point, any rotational movement of gear 5 results in full engagement of gear 9 with gear 5 due to decompression force of spring 6 and curved shape of the teeth of gears 5 and 9 (FIGS. 4 and 6).

FIGS. 7-15 depict a sample embodiment of a clutch by-wire 10 comprising two clutch circuits and one solenoid used as an actuator. Clutch by-wire 10 is located inside of an encasing 12 (encasing 12 is shown partially for clarity). The following suffixes to reference numbers will be used throughout the description of single-solenoid sample embodiment: L (left) and R (right). Clutch by-wire 10 comprises a controller (not shown), one motor circuit 20, one two-position solenoid 40, and two clutch circuits 60L and 60R.

Referring to clutch by-wire 10, left and right circuits 60L, 60R comprise correspondingly engagement assemblies 70L, 70R and axes 62L, 62R the ends of which are attached to the inner races of ball bearings 18L, 18R (best seen in FIG. 8) and to the inner races of ball bearings 19L, 19R. Ball bearings 18L, 18R are attached to ceiling 14 of encasing 12 via their outer races; and ball bearings 19L, 19R are attached to floor 16 of encasing 12 via their outer races. Axes 62L, 62R comprise cylindrical sections 64L, 64R and three-rib sections 66L, 66R identical to three-rib section 900 described previously. Engagement assemblies 70L, 70R comprise position sensors 72L, 72R, position securing square holes 74L, 74R in floor 16 (best seen in FIG. 11), and buffer assemblies 76L, 76R identical to buffer assembly 1 described previously. Buffer assemblies 76L, 76R comprise three-rib sections 66L, 66R, ball bearings 78L, 78R (best seen in FIG. 8), ball bearings 19L, 19R, gears 80L, 80R, compression springs 82L, 82R, and encasing 12. Position sensors 72L, 72R comprise contact pins 73L, 73R implemented as torsion bars made of an electric conducting material and connected to the controller via a wire conduit 84.

Referring to clutch by-wire 10, motor circuit 20 comprises an electric motor 22 comprising rotor 24 rotated around an axis 23, a rotor isolating bearing 28 comprising a rotor attachment part 29 on its outer race, a navigational gear 30, and a buffer assembly 32 identical to buffer assembly 1 described previously. Electrical motor 22 is mounted to ceiling 14 with fasteners 21 and is connected to the controller via wire conduit 84. Rotor 24 comprises a cylindrical section 25 and a three-rib section 26 identical to three-rib section 900 described previously. Buffer assembly 32 comprises three-rib section 26, a ball bearing 34, ball bearing 36, a gear 38, a compression spring 39, and encasing 12.

Figure 9:
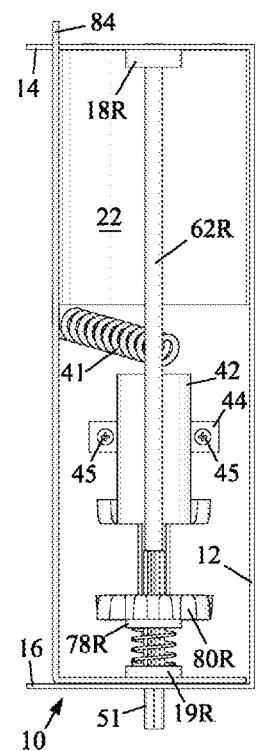
FIG. 9 is a side view of the clutch by-wire sample embodiment depicted in FIG. 7.
Figure 10:
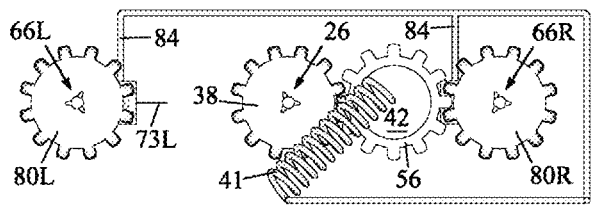
FIG. 10 is a top view of the clutch by-wire sample embodiment depicted in FIG. 7 without the encasing, motor, rotor isolating bearing, and navigational gear.
Figure 11:
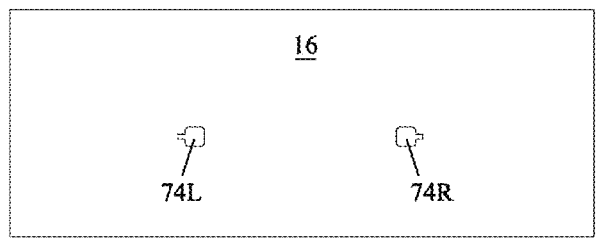
FIG. 11 is a bottom view of the encasing of the clutch by-wire sample embodiment depicted in FIG. 7.

Referring to clutch by-wire 10, solenoid 40 comprises armature 46 and solenoid housing 42 comprising a solenoid attachment part 44 attached to rotor attachment part 29 with fasteners 45 (best seen in FIG. 9). The coil (not shown) of solenoid 40 is connected to the controller via coiled wire conduit 41 and wire conduit 84. Armature 46 comprises a three-rib section 48 identical to three-rib section 900 described previously and a square section 51, a ball bearing 54 mounted via its inner race on armature 46, a solenoid gear 56 mounted to the outer race of ball bearing 54, and a pin 58. Square section 51 comprises a rib 52 adapted to be inserted into square holes 74L or 74R. Rib 52 is made of an electric conductive material; it is connected to the controller via coiled wire conduit 41 and wire conduit 84. Solenoid housing 42 comprises a cutout 43 (best seen in FIG. 7) adapted to host pin 58 kept inside of cutout 43 by retracting power of the solenoid tension spring (not shown) of solenoid 40 when solenoid 40 is switched off by the controller. The solenoid tension spring of solenoid 40 is pulled by armature 46 when the controller switches solenoid 40 on, moving pin 58 out of cutout 43.

The operation of a single-solenoid sample embodiment will be demonstrated in FIGS. 7-15 by switching clutch by-wire 10 from right clutch circuit 60R to left clutch circuit 60L.

FIGS. 7-11 depict clutch by-wire 10 engaged with right clutch circuit 60R as follows. The controller (not shown) keeps solenoid 40 on, resulting in pin 58 being out of cutout 43 and square section 51 inserted inside of position securing square hole 74R isolating solenoid housing 42 by rotor isolating bearing 28 from the potential rotation of rotor 24; also, rib 52 of armature square section 51 touches contact pin 73R of position sensor 72R closing an electrical circuit (controller-wire conduit 84-coiled wire conduit 41-rib 52-contact pin 73R of position sensor 72R-wire conduit 84-controller) indicating to the controller the current position of solenoid 40 as being in front of clutch circuit 60R. In addition, solenoid gear 56 is engaged with buffer assembly 32 via gear 38 and with buffer assembly 76R via gear 80R. Motor 22 is turned on, when directed by the controller, transferring the rotational movement of rotor 24 via gear 38 of motor circuit 20, solenoid gear 56, and gear 80R to axis 62R of clutch circuit 60R.

Figure 12:
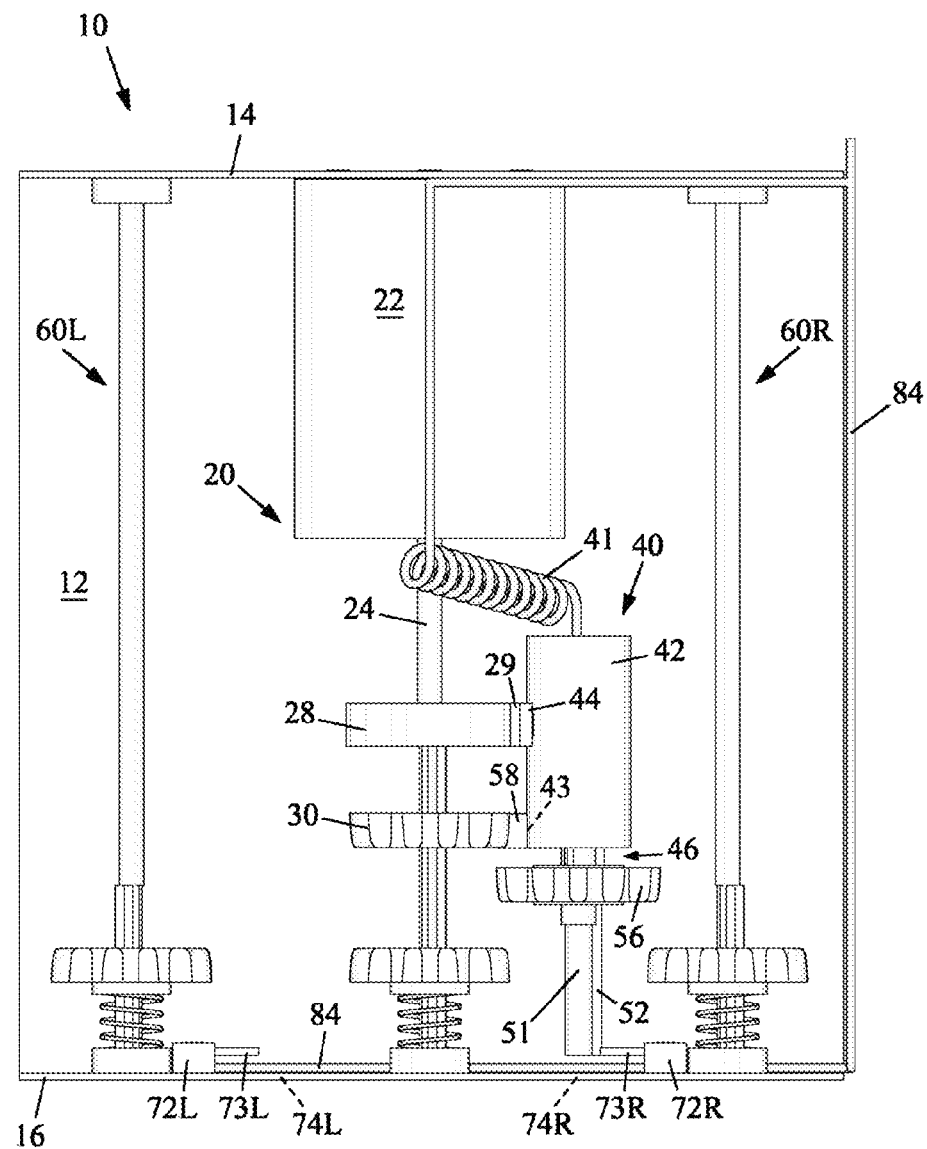
FIG. 12 is a front view of the clutch by-wire sample embodiment depicted in FIG. 7 showing the solenoid in a navigational position in front of the right clutch circuit.
Figure 13:
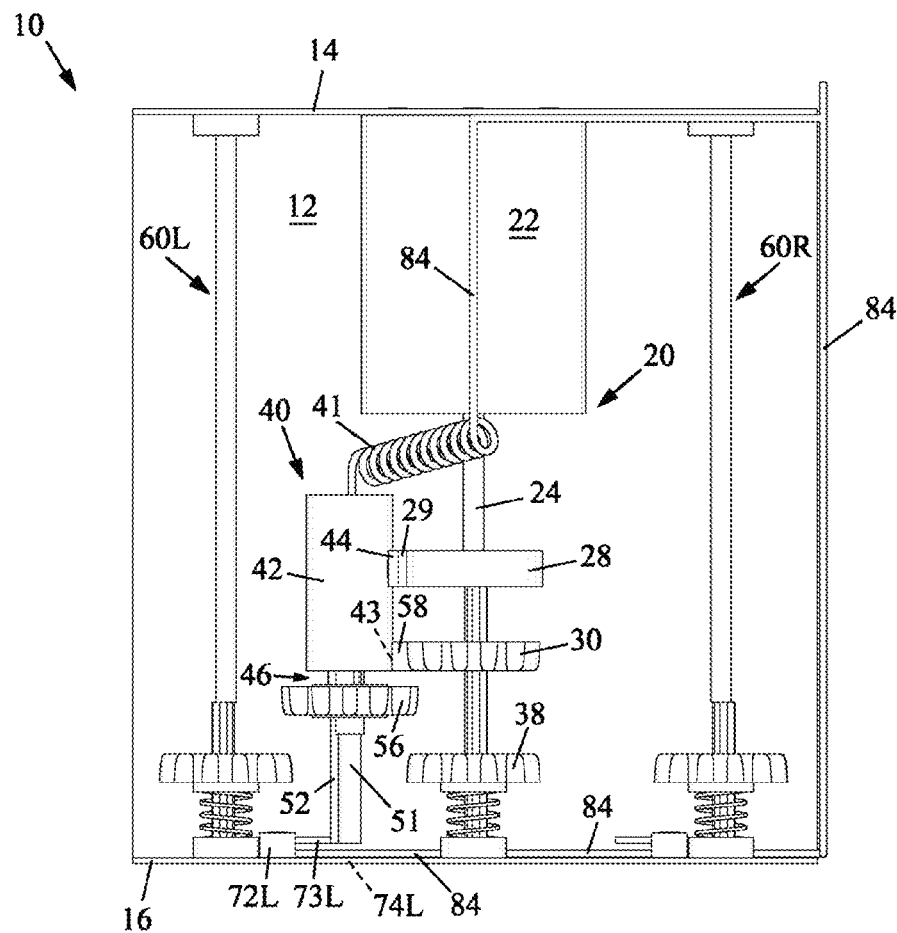
FIG. 13 is a front view of the clutch by-wire sample embodiment depicted in FIG. 7 showing the solenoid in a navigational position in front of the left clutch circuit.
Figure 14:
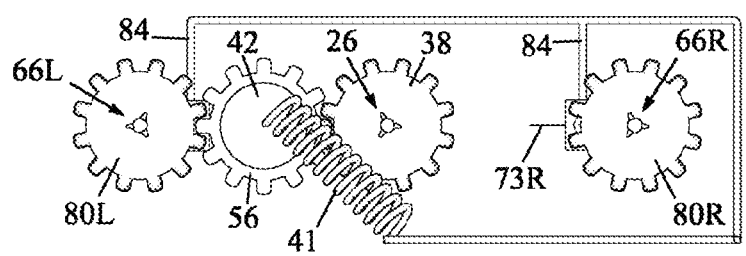
FIG. 14 is a top view of the clutch by-wire sample embodiment depicted in FIG. 13 without the encasing, motor, rotor isolating bearing, and navigational gear.
Figure 15:
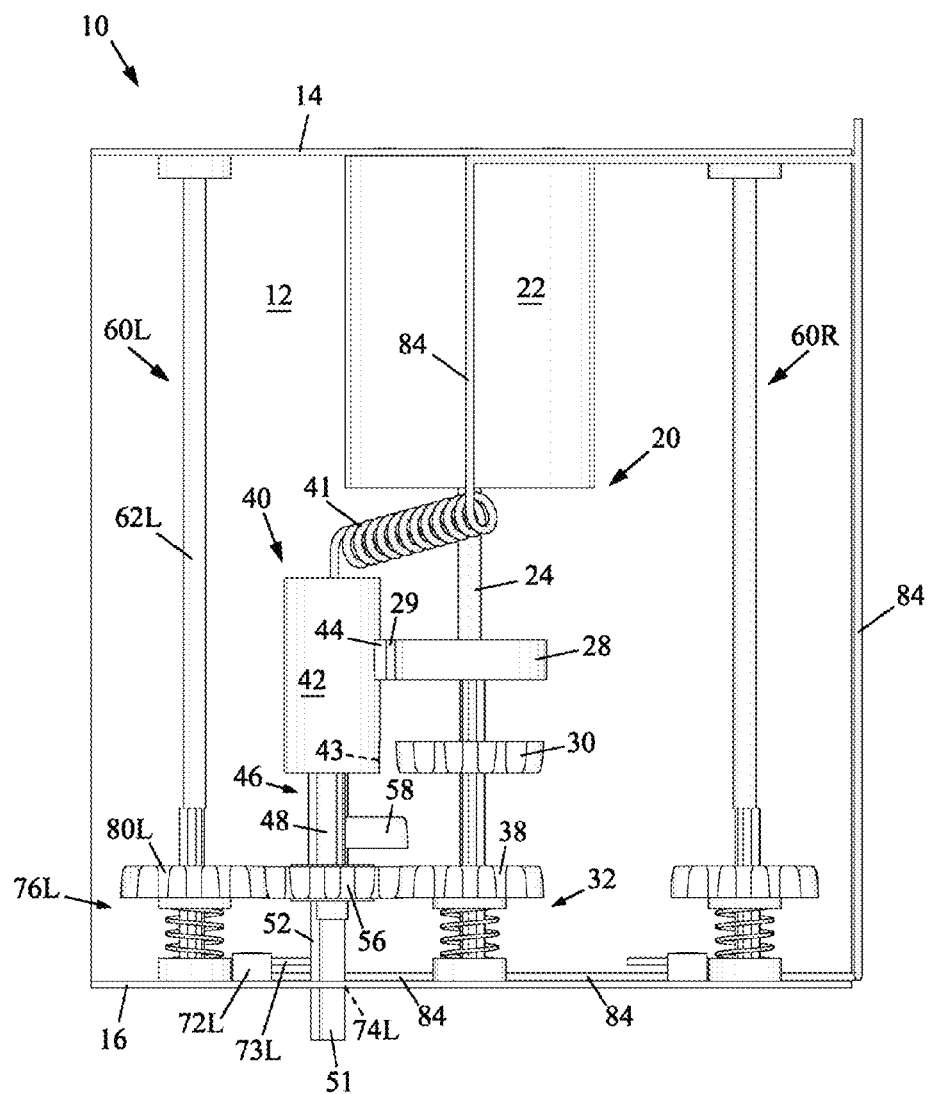
FIG. 15 is a front view of the clutch by-wire sample embodiment depicted in FIG. 7 showing the solenoid engaged with the left clutch circuit.
Figure 16:
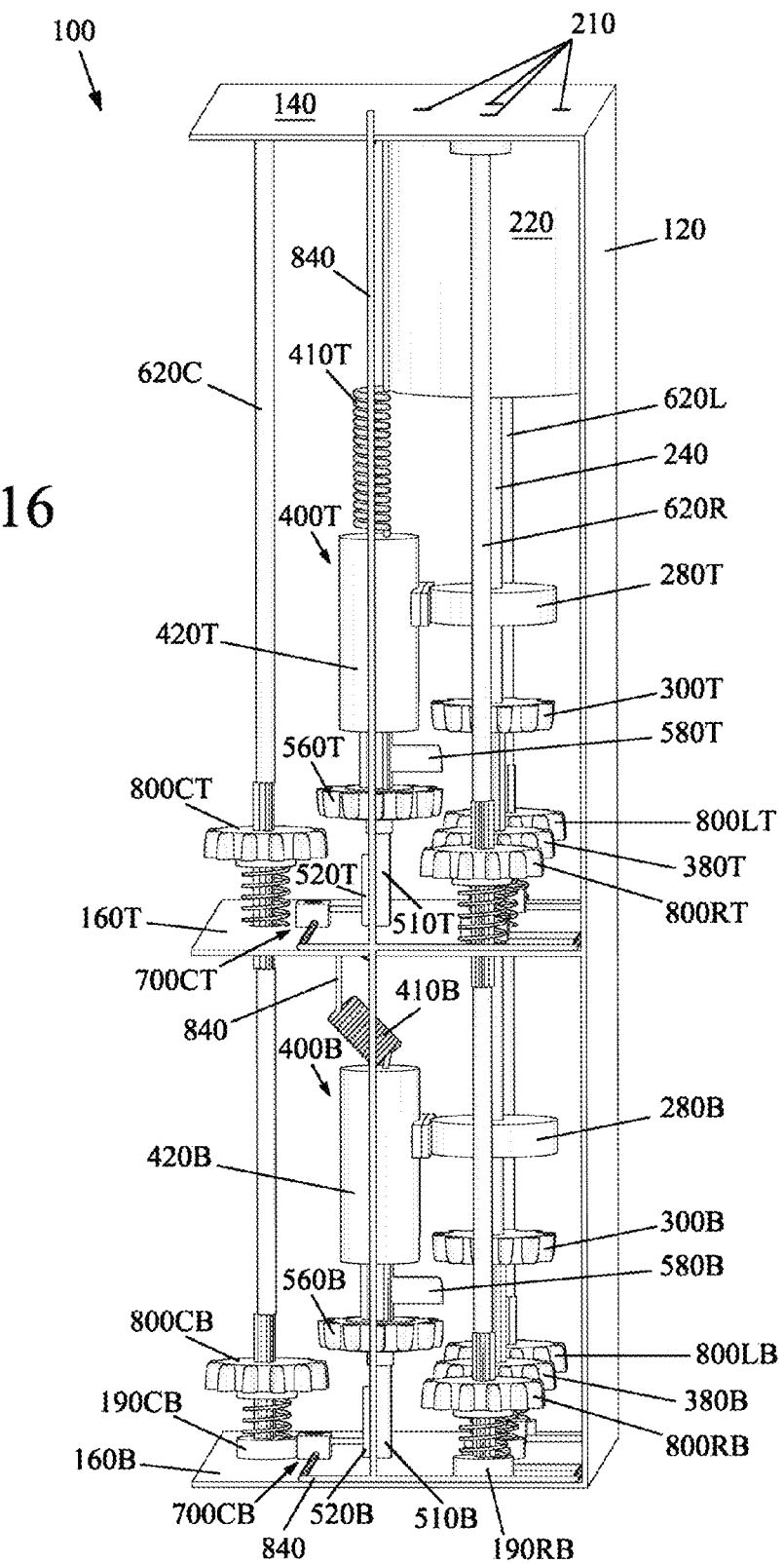
FIG. 16 is a perspective view of a clutch by-wire sample embodiment with two solenoids and three clutch circuits showing the top solenoid in a central neutral position and the bottom solenoid in a central neutral position.
Figure 17:
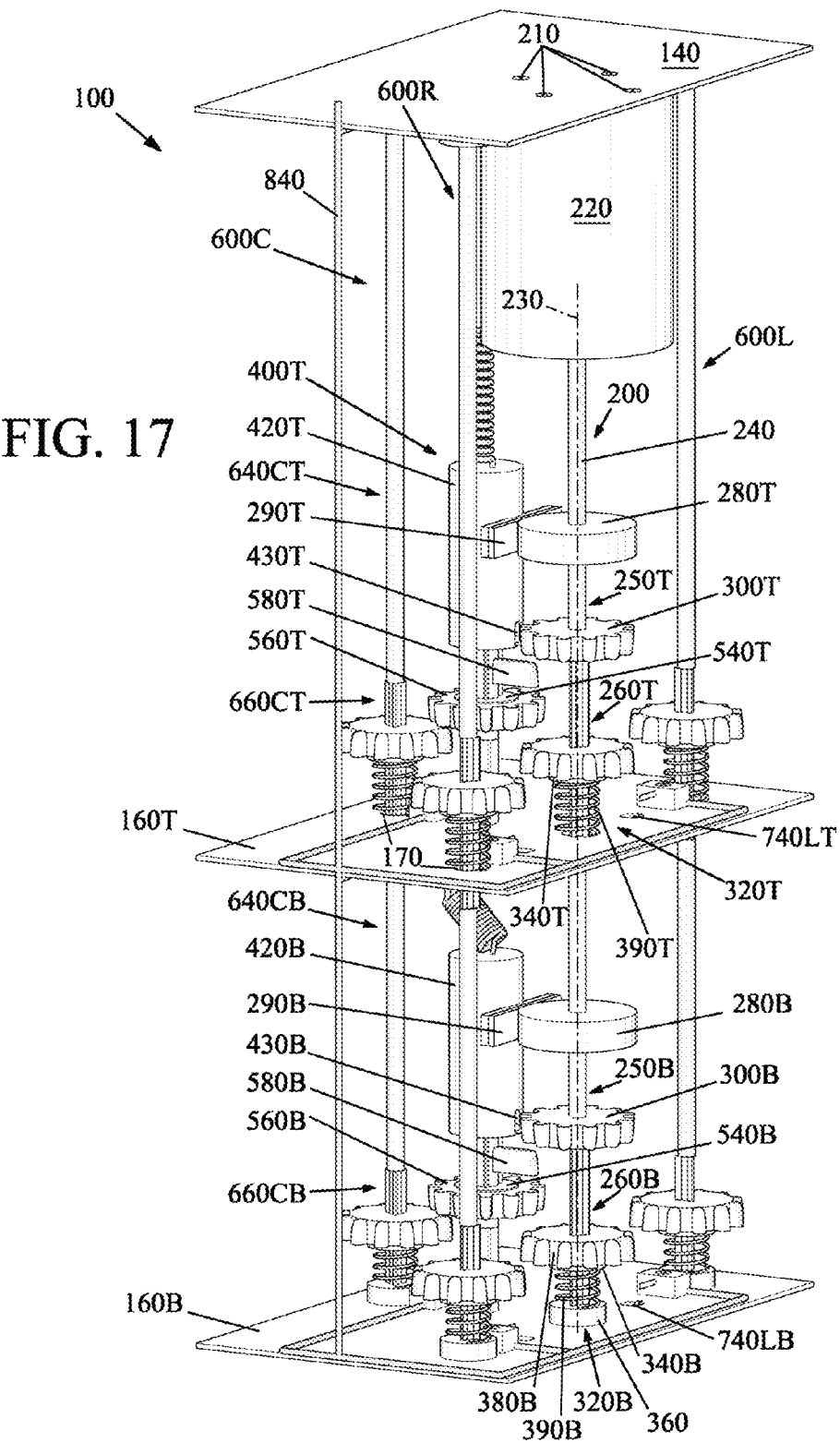
FIG. 17 is another perspective view of the clutch by-wire sample embodiment depicted in FIG. 16 shown without encasing walls.
Figure 18:
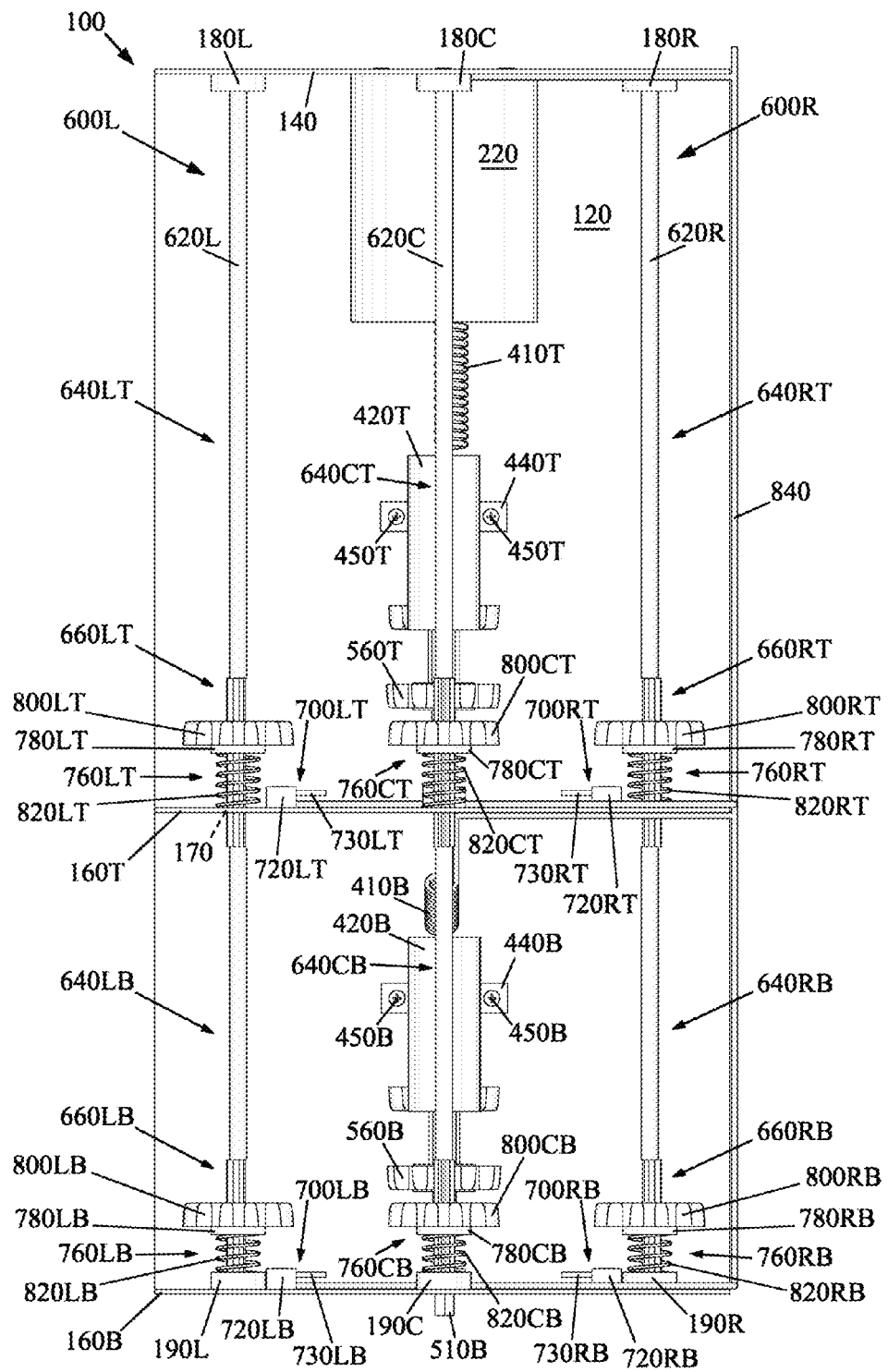
FIG. 18 is a front view of the clutch by-wire sample embodiment depicted in FIG. 16.
Figure 19:
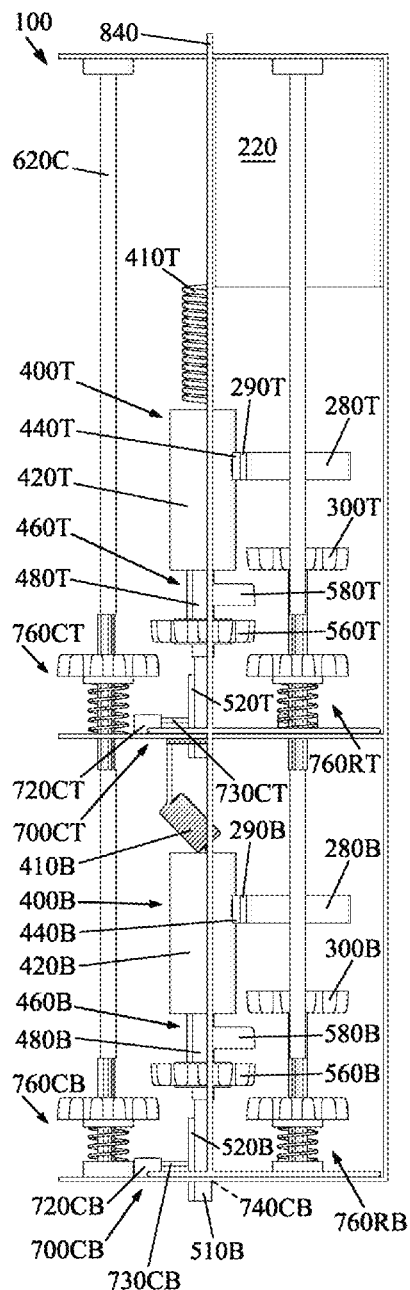
FIG. 19 is a side view of the clutch by-wire sample embodiment depicted in FIG. 16.
Figure 20:
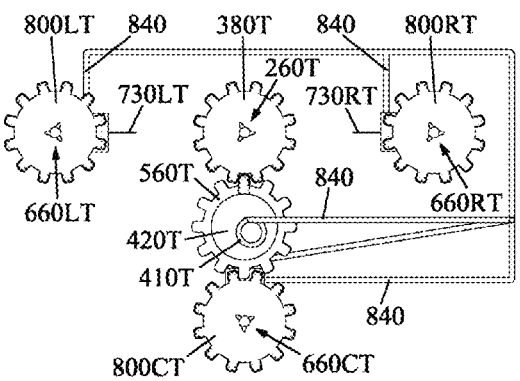
FIG. 20 is a top view of the clutch by-wire sample embodiment depicted in FIG. 16 without the encasing, motor, rotor isolating bearings, and navigational gears.

FIG. 12 depicts clutch by-wire 10 transferred into a navigational position by solenoid 40 switched off by the controller (not shown). The position of armature 46 in the off position of solenoid 40 results in square section 51 being out of position securing square hole 74R and pin 58 engaged with navigational gear 30. If pin 58 is not fully engaged with navigational gear 30 during the transition of solenoid 40 from on to off position, the tension spring (not shown) inside of solenoid housing 42 will not be fully released. Rotation of rotor 24 will cause pin 58 to slip between curved teeth of navigational gear 30 under remaining force of the tension spring and due to curved shape of pin 58 resulting in full engagement of pin 58 with navigational gear 30. Any further rotational movement of rotor 24 will result in solenoid 40 being rotated about rotor 24 via navigational gear 30 and pin 58 engaged with gear 30 and secured in solenoid housing 42 by cutout 43.

Referring to clutch by-wire 10, in order to position solenoid 40 in front of clutch circuit 60L, the controller will turn on motor 22 for rotating solenoid 40 until rib 52 of armature square section 51 touches contact pin 73L (FIGS. 13 and 14) closing an electric circuit (controller-wire conduit 84-coiled wire conduit 41-rib 52-contact pin 73L of position sensor 72L-wire conduit 84-controller) for informing the controller to turn off motor 22.

Referring to clutch by-wire 10, after solenoid 40 being positioned in front of clutch circuit 60L, the controller (not shown) turns on solenoid 40 where movement of armature 46 results in pin 58 being out of cutout 43 and square section 51 inserted inside of position securing square hole 74L (FIG. 15) isolating solenoid housing 42 from the potential rotation of rotor 24 by rotor isolating bearing 28. In addition, solenoid gear 56 is engaged with buffer assembly 32 via gear 38 and with buffer assembly 76L via gear 80L. Motor 22 is turned on, when directed by the controller, transferring the rotational movement of rotor 24 via gear 38, solenoid gear 56, and gear 80L to axis 62L of clutch circuit 60L.

FIGS. 16-43 depict multi-solenoid sample clutch by-wire embodiments 100, 101, 102, and 103 (two solenoids as actuators and three clutch circuits), each located inside of an encasing 120 (encasing 120 is shown partially for clarity). The following suffixes to reference numbers will be used throughout the description of the multi-solenoid sample embodiments: L (left), C (central), R (right), T (top), B (bottom), LT (left top), LB (left bottom), CT (central top), CB (central bottom), RT (right top), RB (right bottom).

Clutch by-wire 100 depicted in FIGS. 16-34 comprises a controller (not shown), one motor circuit 200 (best seen in FIG. 17), two three-position solenoids 400T, 400B, and three clutch circuits 600L, 600C, and 600R.

Referring to clutch by-wire 100, left, center, and right clutch circuits 600L, 600C, 600R comprise correspondingly two engagement assemblies each 700LT, 700LB (best seen in FIG. 18), 700CT, 700CB (best seen in FIGS. 16 and 19), 700RT, 700RB (best seen in FIG. 18) and axes 620L, 620C, 620R going through round holes 170 (best seen in FIG. 21) of floor 160T with the ends installed in ceiling 140 via the inner races of ball bearings 180L, 180C, 180R and in floor 160B via the inner races of ball bearings 190L, 190C, 190R. Ball bearings 180L, 180C, 180R, 190L, 190C, 190R are attached to encasing 120 via their outer races. Axes 620L, 620C, 620R comprise correspondingly two cylindrical sections each 640LT, 640LB, 640CT, 640CB, 640RT, 640RB and two three-rib sections each 660LT, 660LB, 660CT, 660CB, 660RT, 660RB identical to three-rib section 900 described previously. Engagement assemblies 700LT, 700LB, 700CT, 700CB, 700RT, 700RB comprise correspondingly position sensors 720LT, 720LB, 720CT, 720CB, 720RT, 720RB, position securing square holes 740LT, 740CT, 740RT in floor 160T (best seen in FIG. 21) and 740LB, 740CB, 740RB in floor 160B (best seen in FIG. 22), and buffer assemblies 760LT, 760LB, 760CT, 760CB, 760RT, 760RB identical to buffer assembly 1 described previously. Buffer assemblies 760LT, 760CT, 760RT comprise correspondingly three-rib sections 660LT, 660CT, 660RT, ball bearings 780LT, 780CT, 780RT, gears 800LT, 800CT, 800RT, encasing 120, and compression springs 820LT, 820CT, 820RT attached correspondingly with one end to outer race of ball bearing 780LT, 780CT, 780RT and with the other end to floor 160T. Buffer assemblies 760LB, 760CB, 760RB comprise three-rib sections 660LB, 660CB, 660RB, ball bearings 780LB, 780CB, 780RB, ball bearings 190L, 190C, 190R, gears 800LB, 800CB, 800RB, encasing 120, and compression springs 820LB, 820CB, 820RB attached correspondingly with one end to outer race of ball bearing 780LB, 780CB, 780RB and with the other end to outer race of ball bearing 190L, 190C, 190R. Position sensors 720LB, 720CB, 720RB, 720LT, 720CT, 720RT comprise correspondingly contact pins 730LB, 730CB, 730RB, 730LT, 730CT, 730RT implemented as torsion bars made of an electric conducting material and connected to the controller via a wire conduit 840.

Referring to clutch by-wire 100, motor circuit 200 (best seen in FIG. 17) comprises an electric motor 220 comprising rotor 240 rotated around an axis 230, rotor isolating bearings 280T, 280B comprising correspondingly rotor attachment parts 290T, 290B on their outer races, navigational gears 300T, 300B, and buffer assemblies 320T, 320B identical to buffer assembly 1 described previously. Electrical motor 220 is mounted to ceiling 140 with fasteners 210 and connected to the controller via wire conduit 840. Rotor 240 comprises cylindrical sections 250T, 250B and three-rib sections 260T, 260B identical to three-rib section 900 described previously. Buffer assemblies 320T, 320B comprise correspondingly three-rib sections 260T, 260B, ball bearings 340T, 340B, gears 380T, 380B, compression springs 390T, 390B, and encasing 120. Buffer assembly 320B also comprises ball bearing 360.

Figure 21:
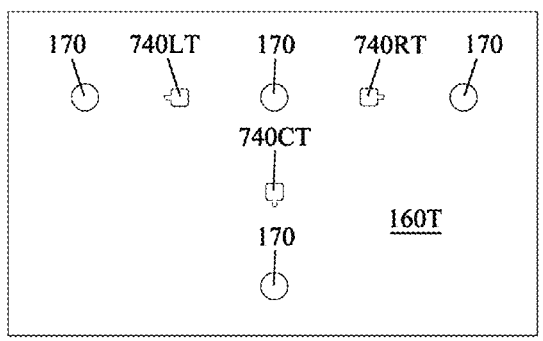
FIG. 21 is a bottom view of the encasing top floor of the clutch by-wire sample embodiment depicted in FIG. 16.
Figure 22:
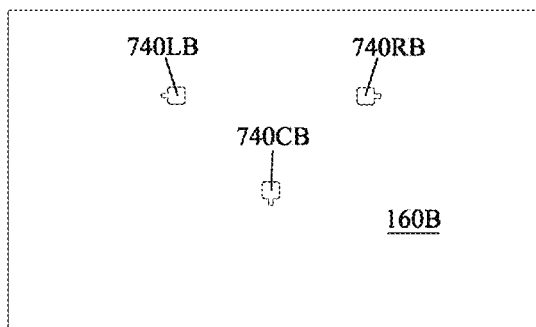
FIG. 22 is a bottom view of the encasing bottom floor of the clutch by-wire sample embodiment depicted in FIG. 16.

Referring to clutch by-wire 100, top and bottom solenoids 400T, 400B comprise correspondingly armatures 460T, 460B (best seen in FIG. 19) and solenoid housings 420T, 420B comprising correspondingly solenoid attachment parts 440T, 440B. The coils (not shown) of solenoids 400T, 400B are connected to the controller correspondingly via coiled wire conduits 410T, 410B and wire conduit 840. Armatures 460T, 460B comprise correspondingly three-rib sections 480T, 480B identical to three-rib section 900 described previously and square sections 510T, 510B, ball bearings 540T, 540B (best seen in FIG. 17) correspondingly mounted via their inner races on armatures 460T, 460B, solenoid gears 560T, 560B correspondingly mounted to the outer races of ball bearings 540T, 540B, and pins 580T, 580B located correspondingly between solenoid housings 420T, 420B and solenoid gears 560T, 560B. Solenoid attachment parts 440T, 440B are attached correspondingly to rotor attachment parts 290T, 290B with fasteners 450T, 450B (best seen in FIG. 18). Square sections 510T, 510B comprise correspondingly ribs 520T, 520B and are adapted to be inserted into square holes 740LT, 740LB, 740CT, 740CB, 740RT, or 740RB (FIGS. 21 and 22). Ribs 520T, 520B are made of an electric conductive material; they are connected to the controller correspondingly via coiled wire conduits 410T, 410B and wire conduit 840. Solenoid housings 420T, 420B comprise cutouts 430T, 430B (best seen in FIG. 17) adapted to host correspondingly pins 580T, 580B when the solenoids 400T, 400B are switched on by the controller (not shown) into a navigational position. Pins 580T, 580B are moved correspondingly out of the cutouts 430T, 430B when the controller switches solenoids 400T, 400B to neutral positions or engagement positions where armatures 460T, 460B are moved out of solenoid housings 420T, 420B enough for square section 510T to be inserted into one of position securing square holes 740LT, 740CT, or 740RT and for square section 510B to be inserted into one of position securing square holes 740LB, 740CB, or 740RB.

The operation of clutch by-wire 100 will be demonstrated by switching it from a neutral position where it is disengaged from any clutch circuit to an engaged position with left clutch circuit 600L and right clutch circuit 600R.

FIGS. 16-22 depict clutch by-wire 100 not being engaged with any of clutch circuits 600L, 600C, 600R as follows. The controller (not shown) keeps solenoids 400T, 400B in the neutral positions in front of clutch circuit 600C resulting in isolating solenoid housings 420T, 420B correspondingly via rotor isolating bearings 280T, 280B from the potential rotation of rotor 240 by keeping pins 580T, 580B out of cutouts 430T, 430B, keeping square sections 510T, 510B inserted correspondingly into position securing square holes 740CT, 740CB, and keeping solenoid gears 560T, 560B not engaged with any of the buffer assemblies 320T, 320B, 760LT, 760LB, 760CT, 760CB, 760RT, 760RB. In addition ribs 520T, 520B of armature square sections 510T, 510B touch correspondingly contact pins 730CT, 730CB of position sensors 720CT, 720CB closing electrical circuits (controller-wire conduit 840-coiled wire conduit 410T-rib 520T-contact pin 730CT of position sensor 720CT-wire conduit 840-controller, controller-wire conduit 840-coiled wire conduit 410B-rib 520B-contact pin 730CB of position sensor 720CB-wire conduit 840-controller) indicating to the controller the current positions of solenoids 400T, 400B as being in front of clutch circuit 600C.

Figure 23:
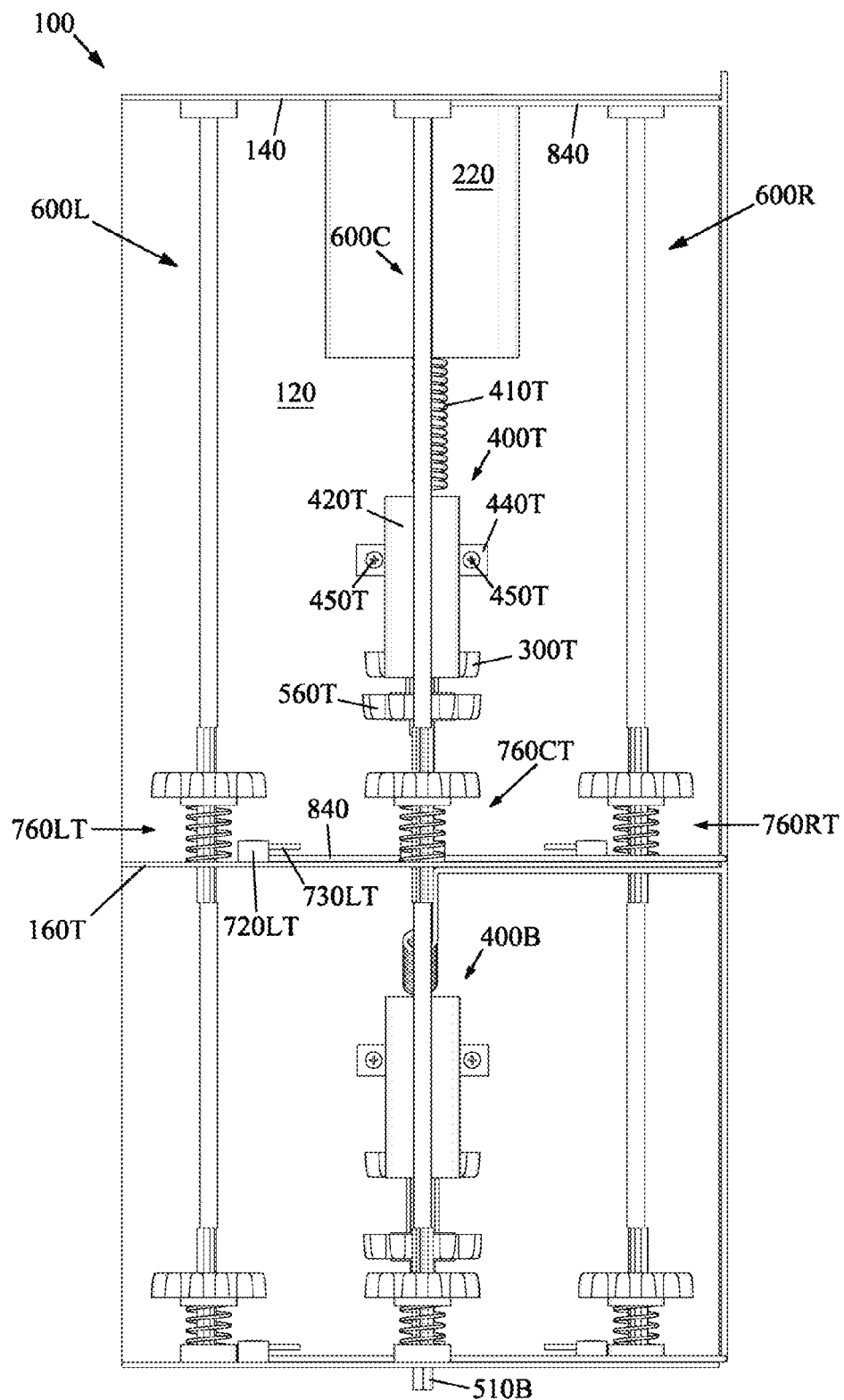
FIG. 23 is a front view of the clutch by-wire sample embodiment depicted in FIG. 16 showing the top solenoid in a central navigational position and the bottom solenoid in a central neutral position.
Figure 24:
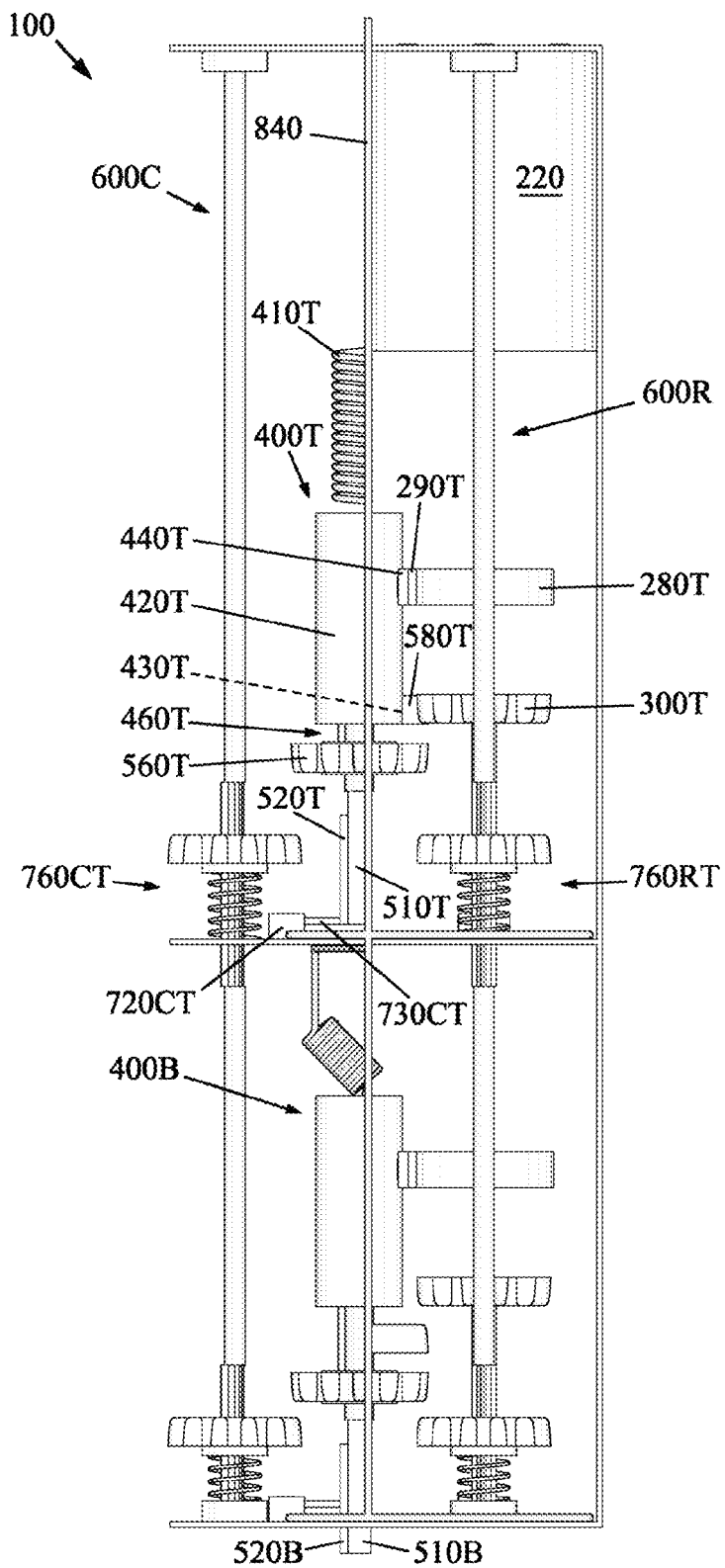
FIG. 24 is a side view of the clutch by-wire sample embodiment depicted in FIG. 23.

FIGS. 23 and 24 depict clutch by-wire 100 with solenoid 400T transferred into a navigational position by the controller (not shown). The navigational position of solenoid 400T is achieved by armature 460T retrieved fully inside of solenoid housing 420T (best seen in FIG. 24) and resulting in square section 510T being out of position securing square hole 740CT, pin 580T retrieved inside of cutout 430T engaging with navigational gear 300T and making solenoid housing 420T connected to rotor 240.

Figure 25:
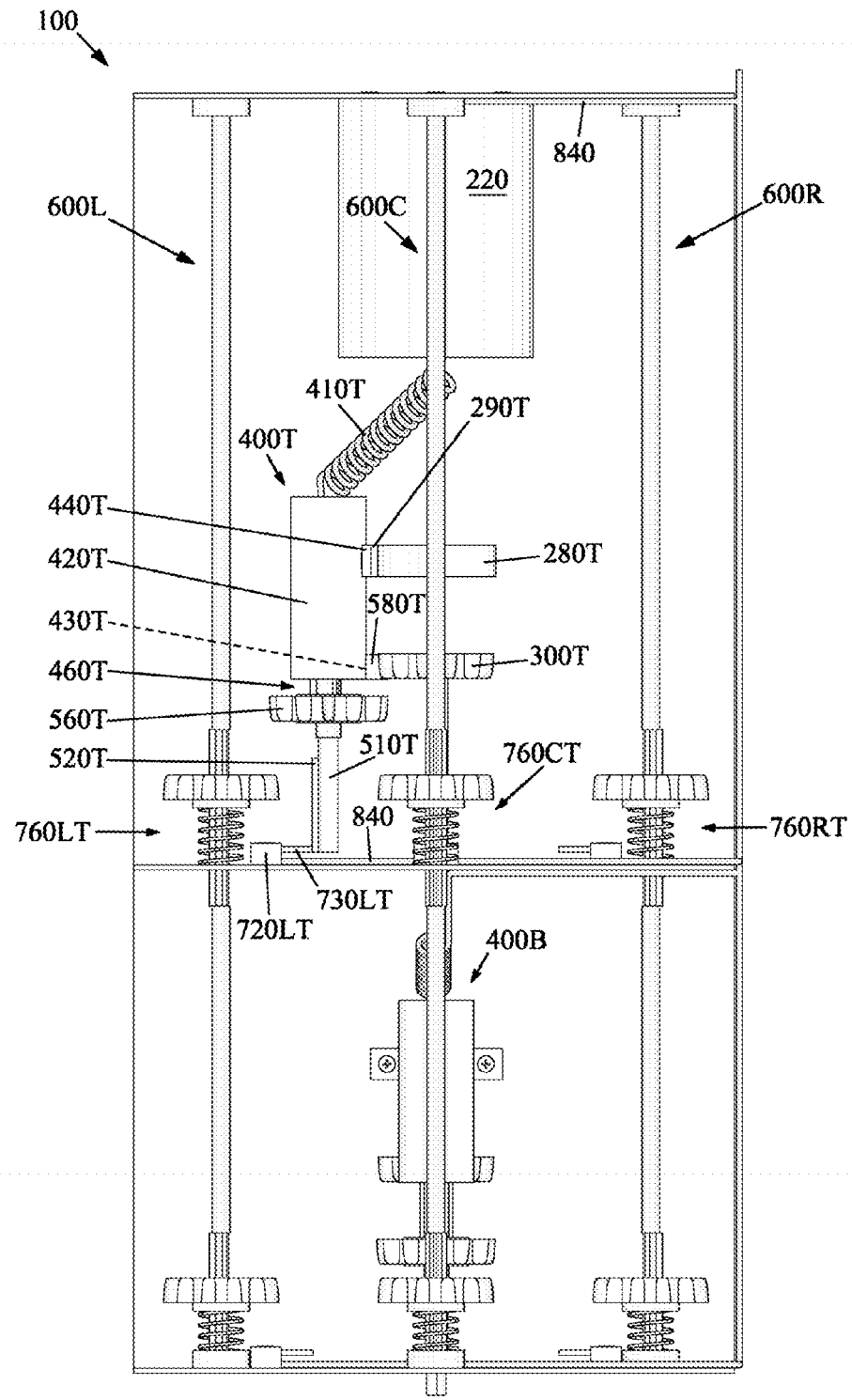
FIG. 25 is a front view of the clutch by-wire sample embodiment depicted in FIG. 16 showing the top solenoid in a left navigational position and the bottom solenoid in a central neutral position.
Figure 26:
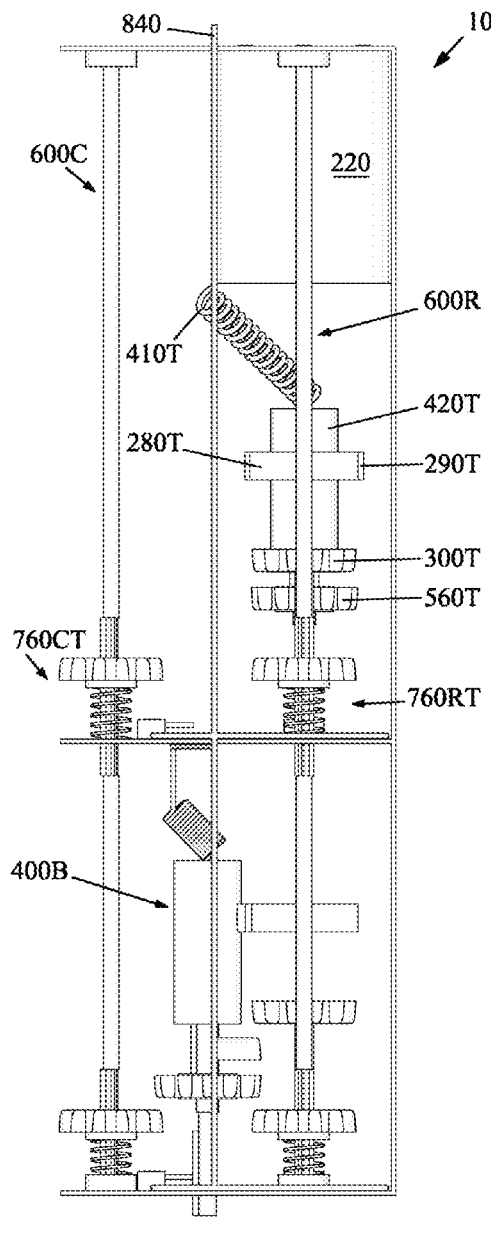
FIG. 26 is a side view of the clutch by-wire sample embodiment depicted in FIG. 25.
Figure 27:
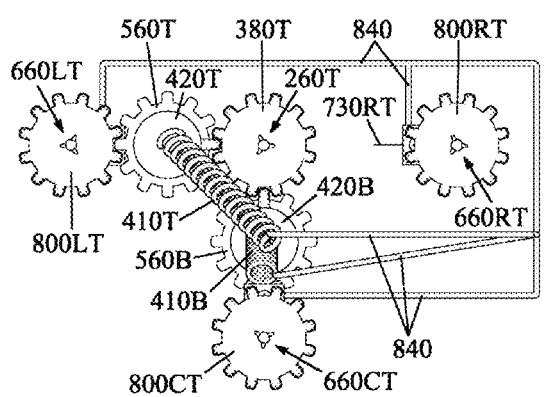
FIG. 27 is a top view of the clutch by-wire sample embodiment depicted in FIG. 25 without the encasing, motor, rotor isolating bearings, and navigational gears.

Referring to clutch by-wire 100, in order to position solenoid 400T in front of clutch circuit 600L, the controller (not shown) will turn on motor 220 for rotating solenoid 400T until rib 520T of armature square section 510T will touch contact pin 730LT closing an electric circuit (controller-wire conduit 840-coiled wire conduit 410T-rib 520T-contact pin 730LT of position sensor 720LT-wire conduit 840-controller) for informing the controller to turn off motor 220 (FIGS. 25-27).

Referring to clutch by-wire 100, after solenoid 400T being positioned in front of clutch circuit 600L, the controller switches solenoid 400T to a neutral position (FIGS. 28 and 29) in front of clutch circuit 600L where movement of armature 460T results in isolating solenoid housings 420T via rotor isolating bearing 280T from the potential rotation of rotor 240 by keeping pin 580T out of cutout 430T, keeping square section 510T inserted into securing square hole 740LT, and keeping solenoid gear 560T not engaged with any of the top buffer assemblies 320T, 760LT, 760CT, and 760RT. In addition, rib 520T of armature square section 510T touches contact pin 730LT of position sensor 720LT closing an electrical circuit (controller-wire conduit 840-coiled wire conduit 410T-rib 520T-contact pin 730LT of position sensor 720LT-wire conduit 840-controller) indicating to the controller the current positions of solenoid 400T as being in front of clutch circuit 600L.

Figure 28:
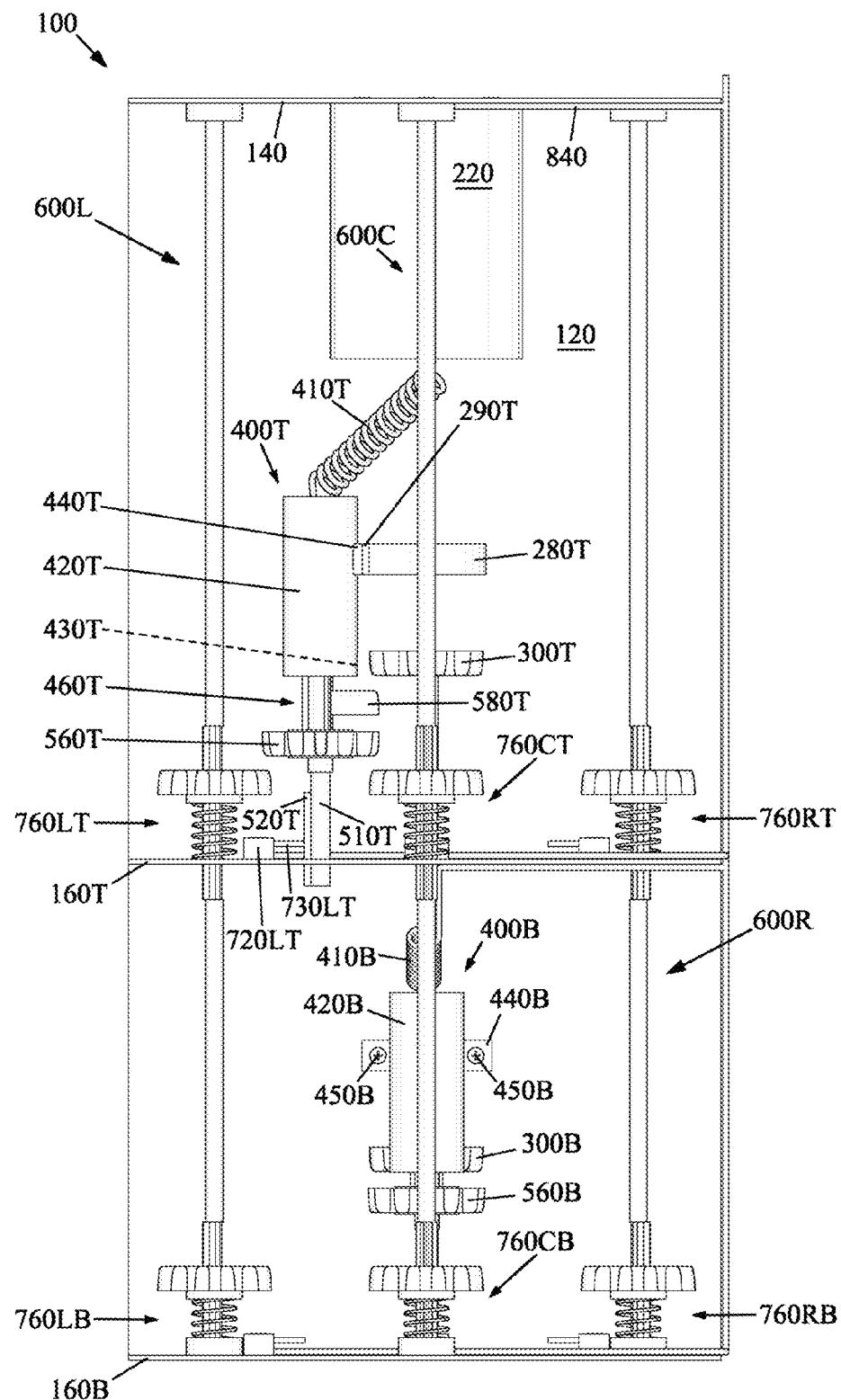
FIG. 28 is a front view of the clutch by-wire sample embodiment depicted in FIG. 16 showing the top solenoid in a left neutral position and the bottom solenoid in a central navigational position.
Figure 29:
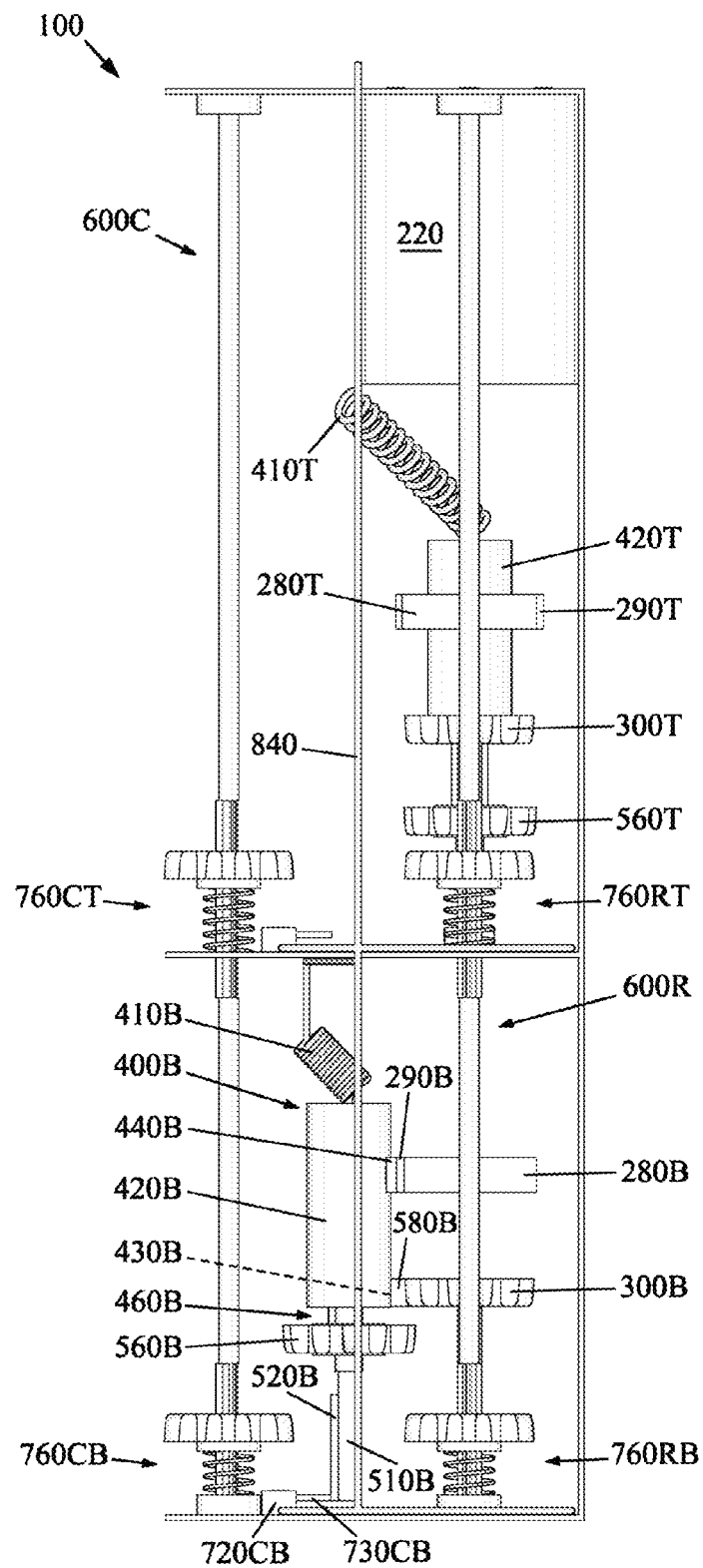
FIG. 29 is a side view of the clutch by-wire sample embodiment depicted in FIG. 28.
Figure 30:
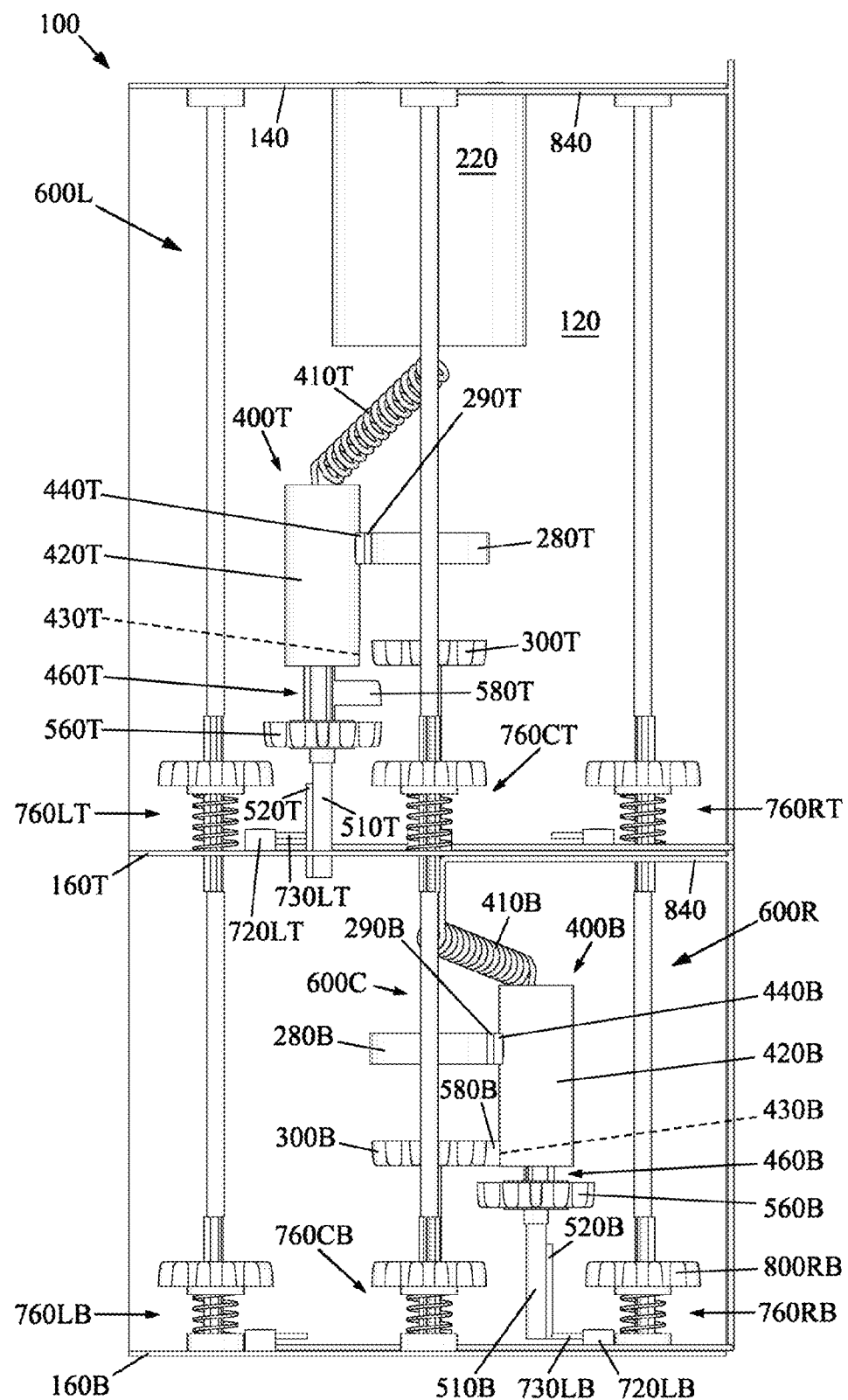
FIG. 30 is a front view of the clutch by-wire sample embodiment depicted in FIG. 16 showing the top solenoid in a left neutral position and the bottom solenoid in a right navigational position.
Figure 31:
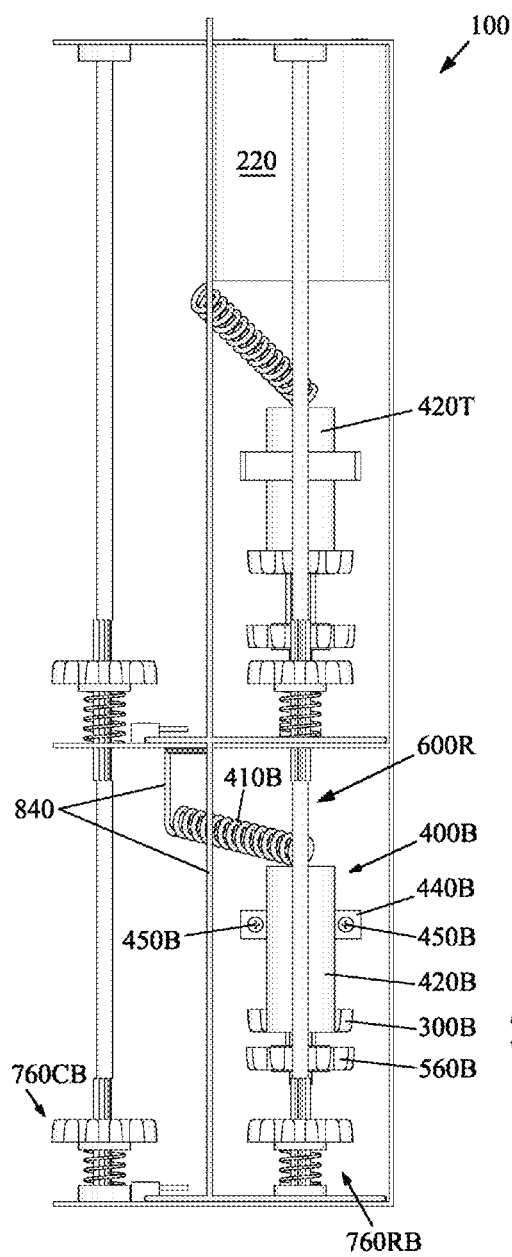
FIG. 31 is a side view of the clutch by-wire sample embodiment depicted in FIG. 30.
Figure 32:
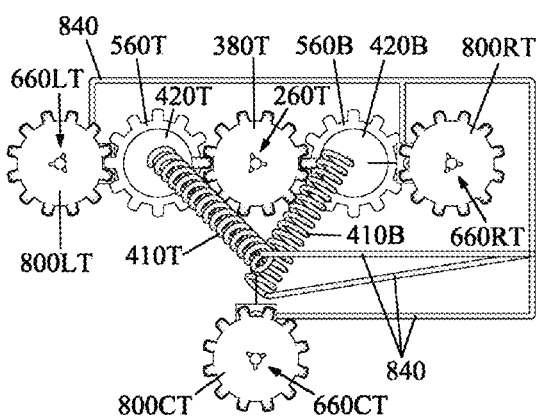
FIG. 32 is a top view of the clutch by-wire sample embodiment depicted in FIG. 30 without the encasing, motor, rotor isolating bearings, and navigational gears.
Figure 33:
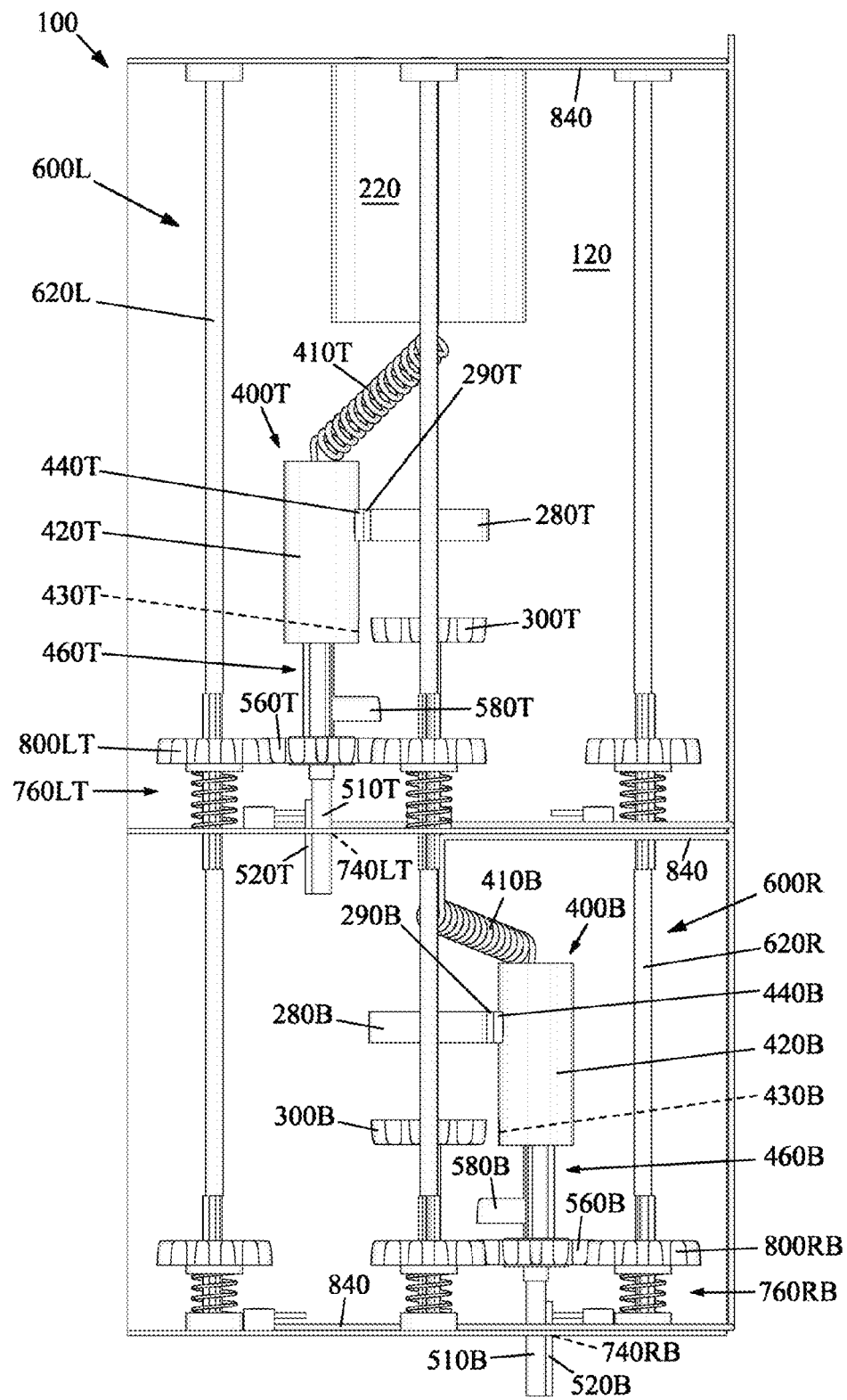
FIG. 33 is a front view of the clutch by-wire sample embodiment depicted in FIG. 16 showing the top solenoid in a left engaged position and the bottom solenoid in a right engaged position.
Figure 34:
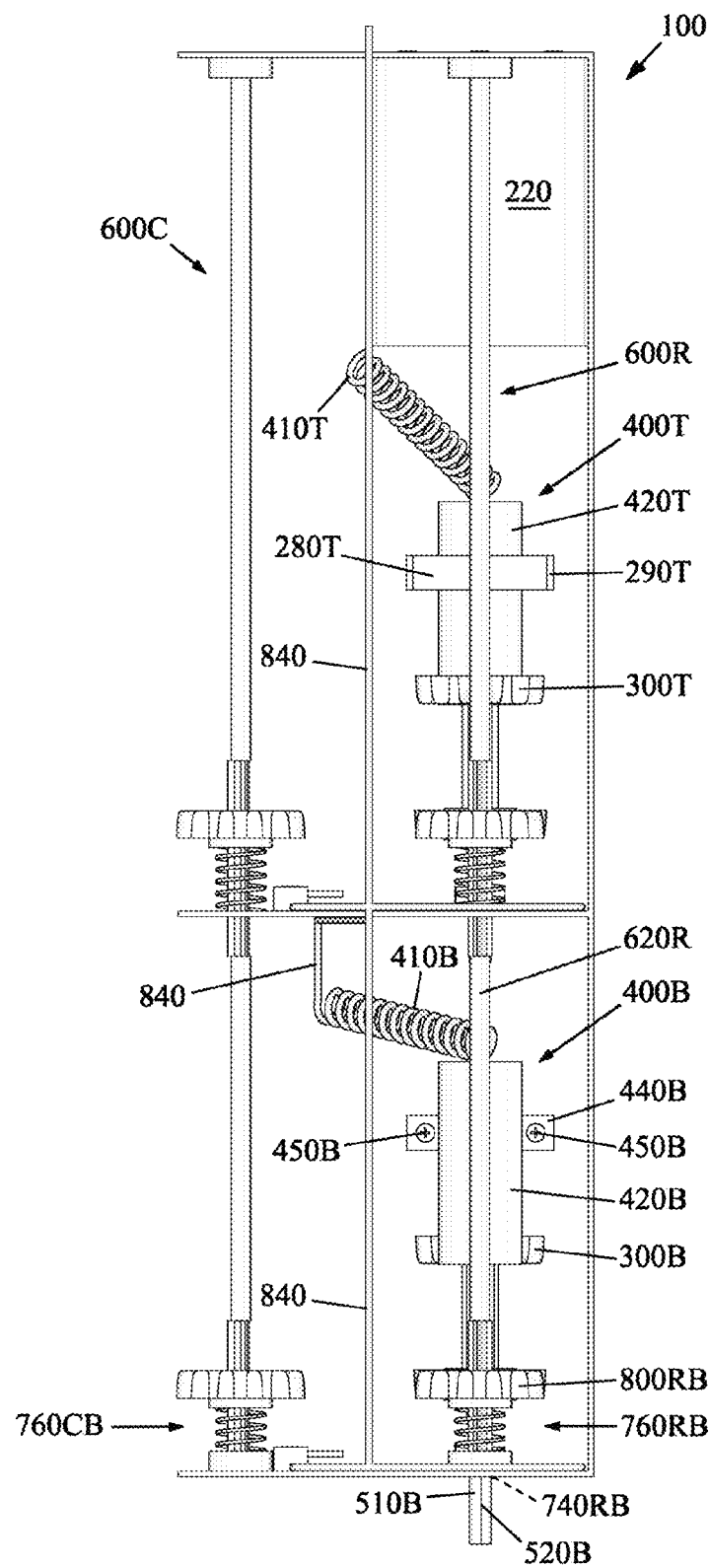
FIG. 34 is a side view of the clutch by-wire sample embodiment depicted in FIG. 33.

FIGS. 28-29 depict clutch by-wire 100 with solenoid 400B transferred into a navigational position by the controller (not shown). The navigational position of solenoid 400B being achieved by armature 460B retrieved fully inside of solenoid housing 420B and resulting in square section 510B being out of position securing square hole 740CB, pin 580B retrieved inside of cutout 430B engaging with navigational gear 300B and making solenoid housing 420B connected to rotor 240.

Referring to clutch by-wire 100, in order to position solenoid 400B in front of clutch circuit 600R (FIGS. 30-32), the controller will turn on motor 220 for rotating solenoid 400B until rib 520B of armature square section 510B will touch contact pin 730RB closing an electric circuit (controller-wire conduit 840-coiled wire conduit 410B-rib 520B-contact pin 730RB of position sensor 720RB-wire conduit 840-controller) for informing the controller to turn off motor 220.

Referring to clutch by-wire 100, after solenoid 400T being in a neutral position in front of clutch circuit 600L and solenoid 400B being in a navigational position in front of clutch circuit 600R, the controller switches solenoids 400T, 400B to engagement positions (FIGS. 33 and 34) where movement of armatures 460T and 460B results in pins 580T and 580B being out of cutouts 430T and 430B, square sections 510T and 510B inserted correspondingly inside of position securing square holes 740LT and 740RB isolating solenoid housing 420T and 420B correspondingly by rotor isolating bearing 280T and 280B from the potential rotation of rotor 240. In addition, solenoid gear 560T is engaged with buffer assembly 320T via gear 380T and with buffer assembly 760LT via gear 800LT, where solenoid gear 560B is engaged with buffer assembly 320B via gear 380B and with buffer assembly 760RB via gear 800RB as identical to buffer assembly 1 described previously. Motor 220 is turned on, when directed by the controller, transferring the rotational movement of rotor 240 via gear 380T, solenoid gear 560T, and gear 800LT to axis 620L of clutch circuit 600L and via gear 380B, solenoid gear 560B, and gear 800RB to axis 620R of clutch circuit 600R.

Referring to clutch by-wire 100, for simplicity, sequential positioning of solenoids has been described so far, where simultaneous positioning of solenoids may speed up placement thereof in front of desired clutch circuits considerably. Simultaneous positioning of solenoids 400T, 400B which are in neutral positions in front of clutch circuit 600C (described previously can be performed, for instance, when the controller places the solenoids simultaneously into navigational positions (placing solenoid 400T into a navigational position and placing solenoid 400B into a navigational position has been described previously), then turns on motor 220 until rib 520T touches contact pin 730LT closing the electrical circuit (described previously) informing the controller to stop motor 220 (solenoid 400T is in front of clutch circuit 600L), then places solenoid 400T in a neutral position as was previously described, then turns on motor 220 until rib 520B touches contact pin 730RB closing the electrical circuit (described previously) informing the controller to stop motor 220 (solenoid 400B is in front of clutch circuit 600R), then places both solenoids in the engagement positions as was previously described. The engagement speed benefit will vary depending on relative position of desired clutch circuits.

Clutch by-wire 101 depicted in FIGS. 35-39 is similar to clutch by-wire 100, but it is modified in such way that a direction of rotational movement received simultaneously by clutch circuits can be set by the controller individually for each of the clutch circuits, wherein clutch by-wire 101 further comprises reversal assemblies 701LT, 701LB, 701CT, 701CB, 701RT, 701RB comprising correspondingly position sensors 721LT, 721LB, 721CT, 721CB, 721RT, 721RB, position securing square holes 741LT, 741CT, 741RT in floor 160T (best seen in FIG. 38) and 741LB, 741CB, 741RB in floor 160B (best seen in FIG. 39), and buffer assemblies 761LT, 761LB, 761CT, 761CB, 761RT, 761RB identical to buffer assembly 1 described previously. Buffer assemblies 761LT, 761CT, 761RT comprise correspondingly three-rib sections 771LT, 771CT, 771RT ending with e-clips 791L, 791C, 791R, ball bearings 781LT, 781CT, 781RT, gears 801LT, 801CT, 801RT, encasing 120, and compression springs 821LT, 821CT, 821RT attached correspondingly with one end to outer race of ball bearing 781LT, 781CT, 781RT and with the other end to floor 160T. Buffer assemblies 761LB, 761CB, 761RB comprise three-rib sections 771LB, 771CB, 771RB, ball bearings 781LB, 781CB, 781RB, ball bearings 191L, 191C, 191R, gears 801LB, 801CB, 801RB, encasing 120, and compression springs 821LB, 821CB, 821RB attached correspondingly with one end to outer race of ball bearing 781LB, 781CB, 781RB and with the other end to outer race of ball bearing 191L, 191C, 191R. Position sensors 721LB, 721CB, 721RB, 721LT, 721CT, 721RT comprise correspondingly contact pins 731LB, 731CB, 731RB, 731LT, 731CT, 731RT implemented as torsion bars made of an electric conducting material and connected to the controller via a wire conduit 840. Gears 801LT, 801LB, 801CT, 801CB, 801RT, 801RB are engaged correspondingly with gears 800LT, 800LB, 800CT, 800CB, 800RT, 800RB.

Referring to clutch by-wire 101, the process of positioning a solenoid in front of a reversal assembly, engaging with a reversal assembly, and disengaging from a reversal assembly is similar to positioning a solenoid in front of an engagement assembly, engaging with an engagement assembly, and disengaging from an engagement assembly as previously described. Since gears 801LT, 801LB, 801CT, 801CB, 801RT, 801RB are engaged correspondingly with gears 800LT, 800LB, 800CT, 800CB, 800RT, 800RB, any rotational movement transferred from motor circuit 200 to engagement assemblies 700LT, 700LB, 700CT, 700CB, 700RT, 700RB via solenoids 400T, 400B engaged with reversal assemblies 701LT, 701LB, 701CT, 701CB, 701RT will result in reversal rotation of axes 620L, 620C, 620R of clutch circuits 600L, 600C, 600R versus rotational movement transferred from motor circuit 200 to engagement assemblies 700LT, 700LB, 700CT, 700CB, 700RT, 700RB via solenoids 400T, 400B engaged directly with engagement assemblies 700LT, 700LB, 700CT, 700CB, 700RT.

Figure 40:
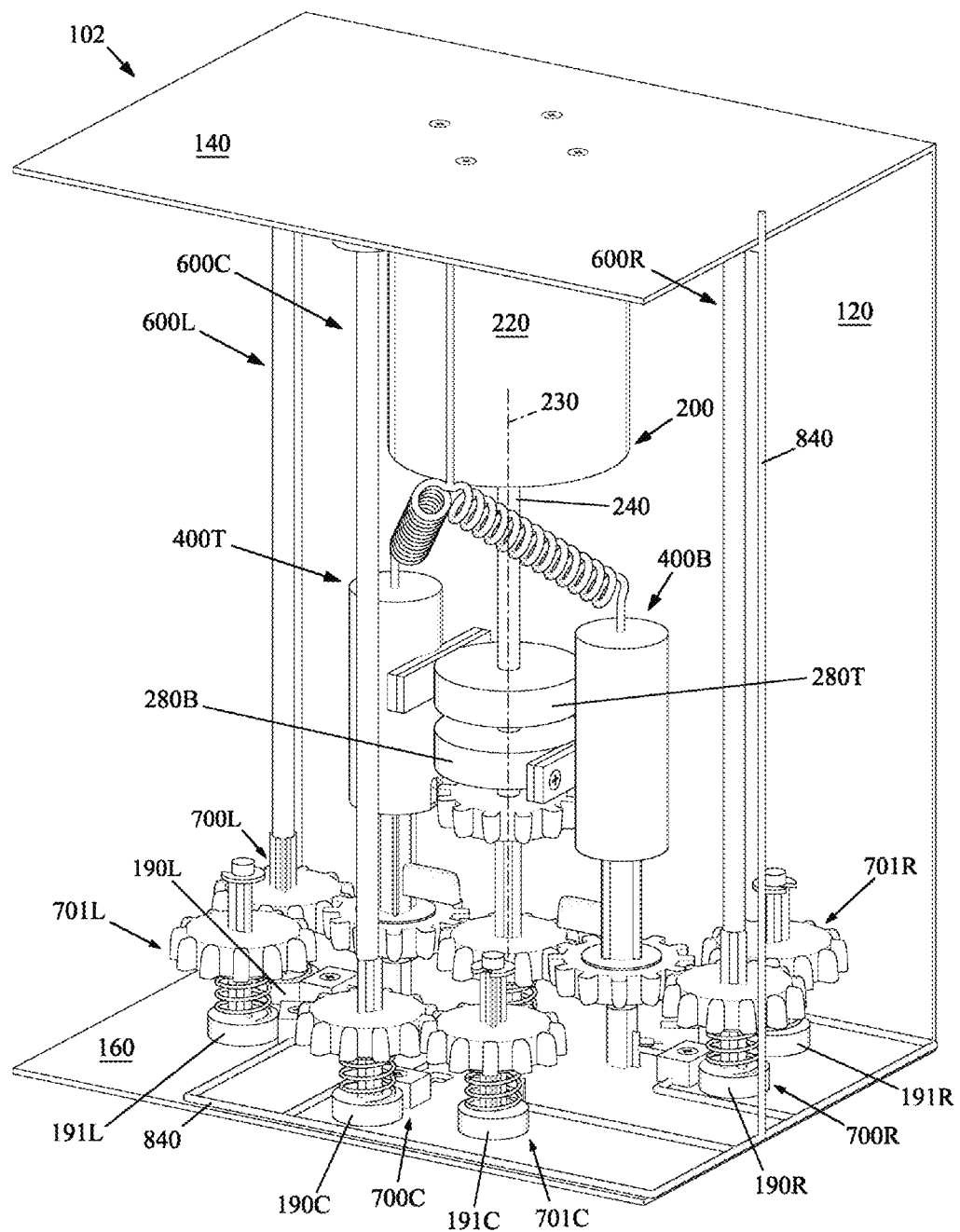
FIG. 40 is a perspective view of a clutch by-wire sample embodiment similar to clutch by-wire depicted in FIG. 35, but modified in such way that each of the clutch circuits requires only one engagement assembly and only one reversal assembly.
Figure 41:
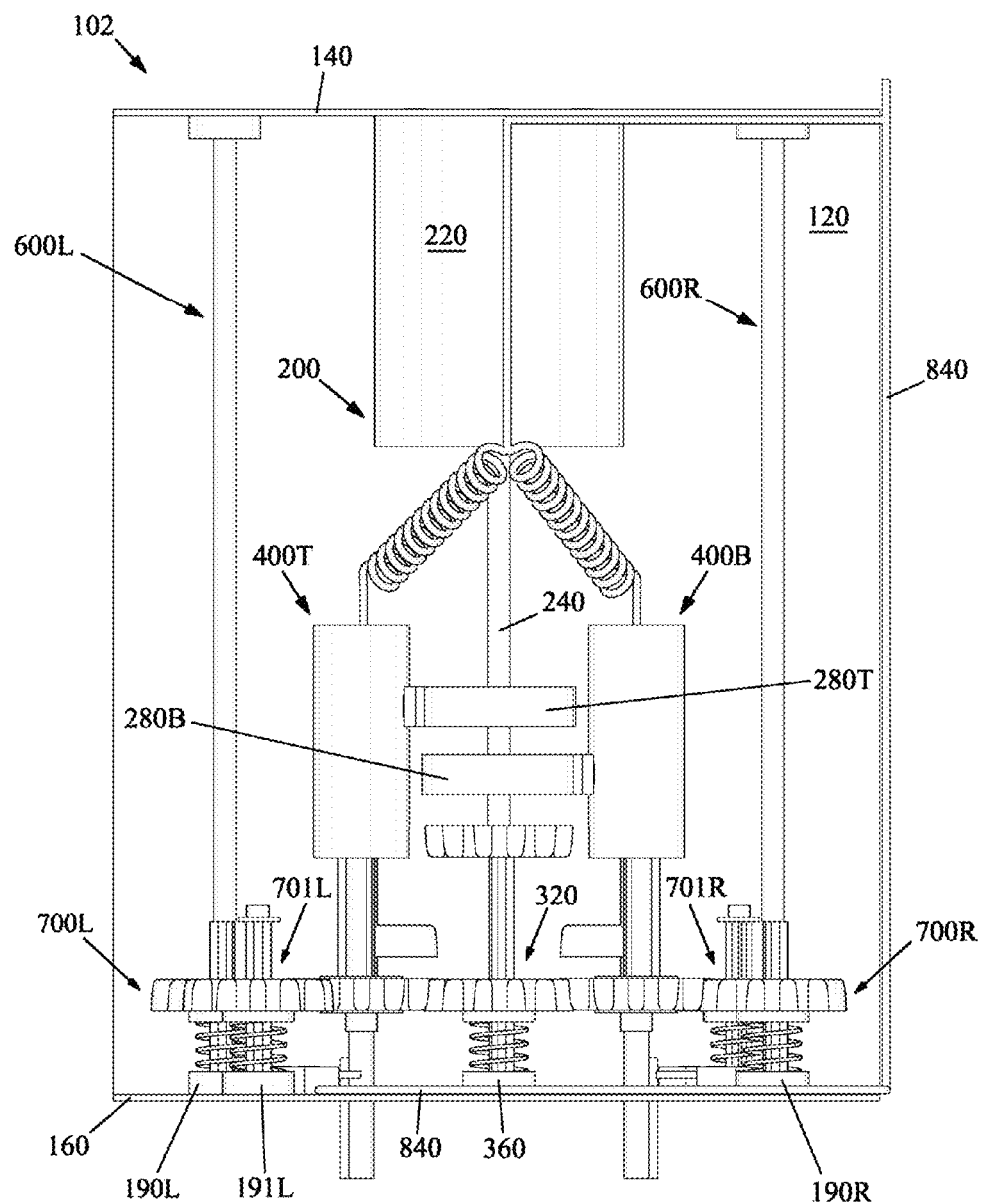
FIG. 41 is a front view of the clutch by-wire sample embodiment depicted in FIG. 40 without the center clutch circuit and the center reversal assembly.

Clutch by-wire 102 depicted in FIGS. 40 and 41 is similar to clutch by-wire 101, but it is modified in such way that each of the clutch circuits requires only one engagement assembly and only one reversal assembly.

Figure 35:
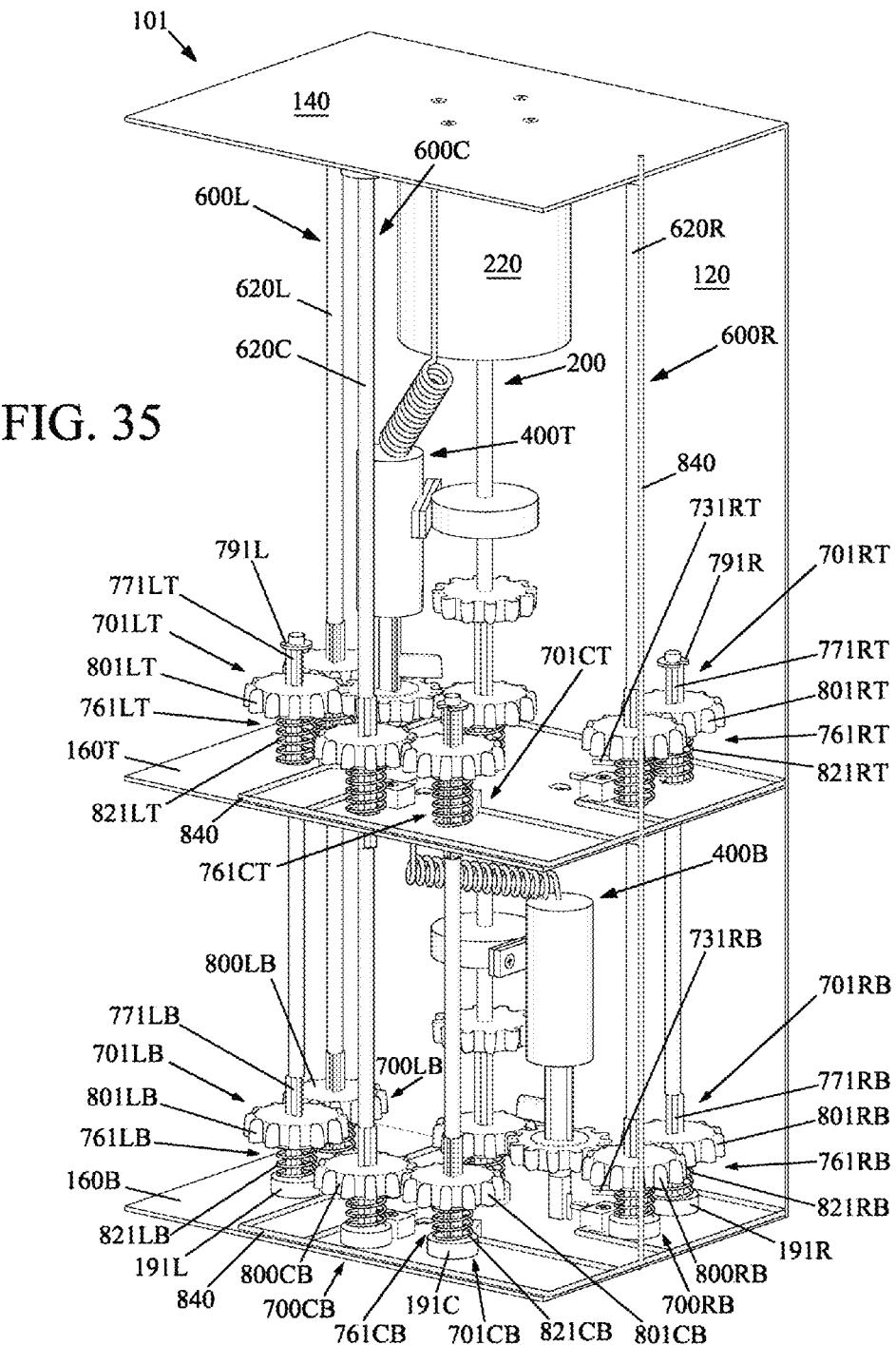
FIG. 35 is a perspective view of a clutch by-wire sample embodiment similar to clutch by-wire depicted in FIG. 16, but modified in such way that a direction of rotational movement received simultaneously by clutch circuits can be set by a controller individually for each of the clutch circuits.
Figure 36:
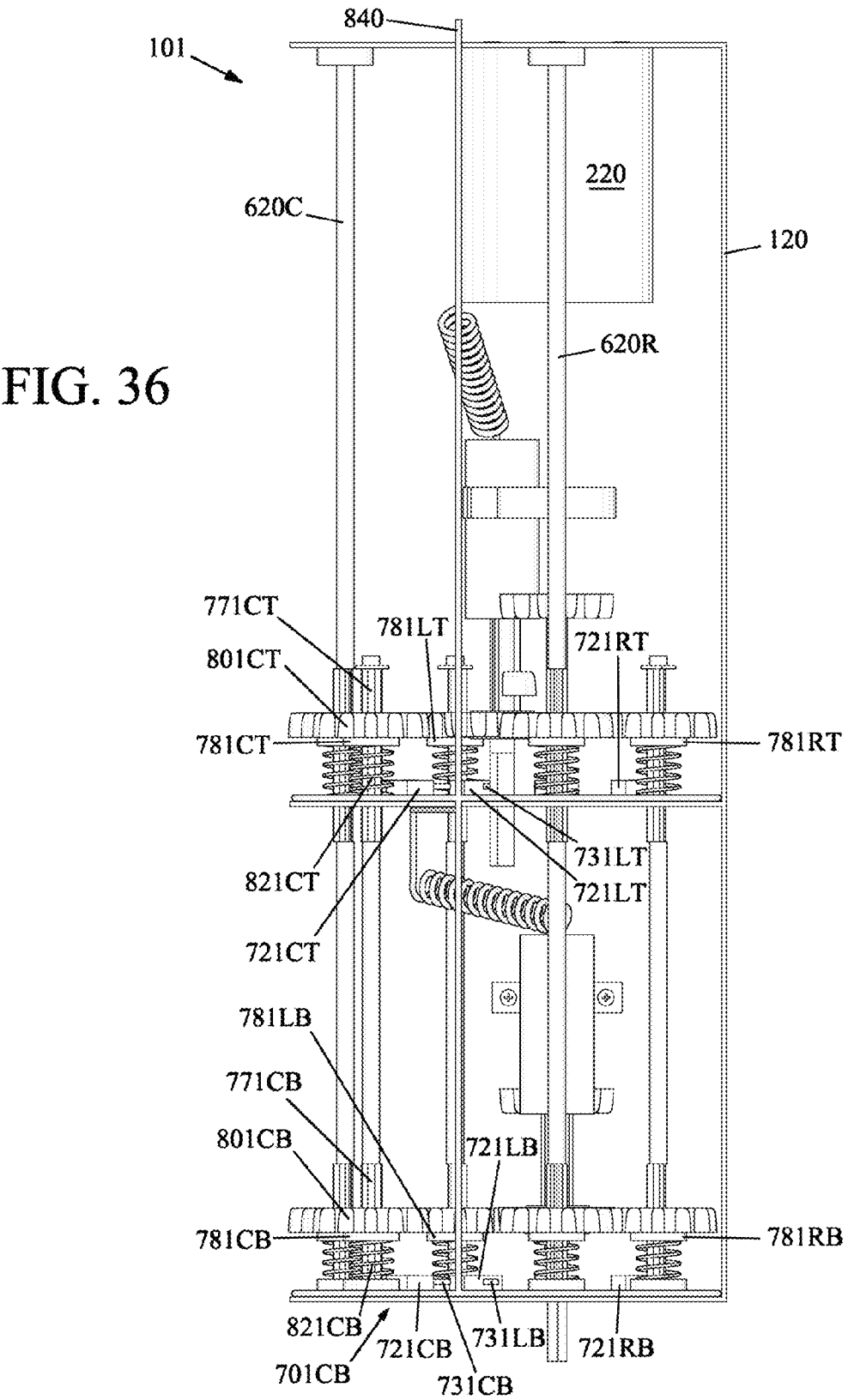
FIG. 36 is a side view of the clutch by-wire sample embodiment depicted in FIG. 35.
Figure 37:
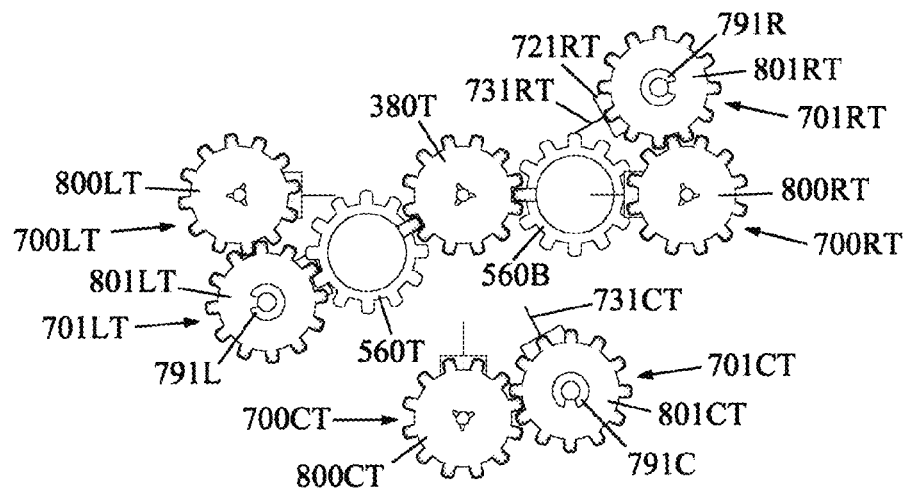
FIG. 37 is a top view of the clutch by-wire sample embodiment depicted in FIG. 35 without the encasing, motor, rotor isolating bearings, navigational gears, and wire conduits.
Figure 38:
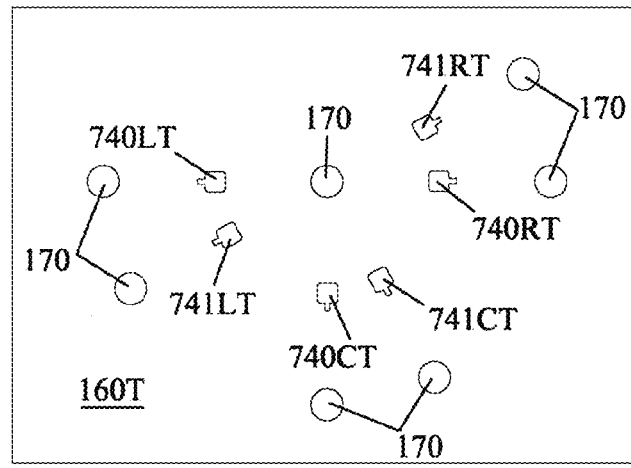
FIG. 38 is a bottom view of the encasing top floor of the clutch by-wire sample embodiment depicted in FIG. 35.
Figure 39:
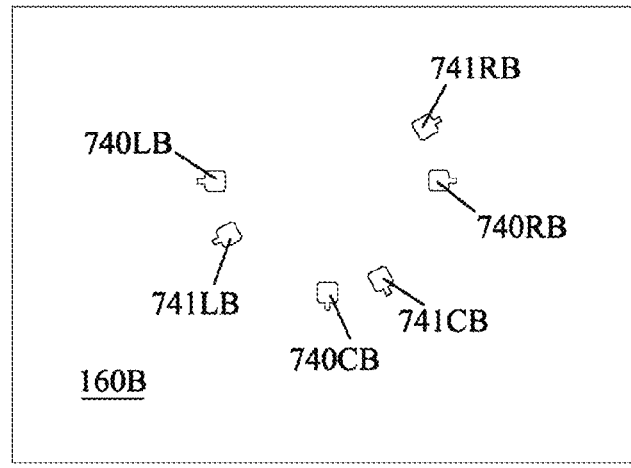
FIG. 39 is a bottom view of the encasing bottom floor of the clutch by-wire sample embodiment depicted in FIG. 35.

Referring to clutch by-wire 102, the embodiment depicted in FIGS. 40 and 41 comprises clutch by-wire 102, encasing 120, ceiling 140, only one floor 160 identical to floor 160B seen in FIG. 39, motor circuit 200, two solenoids 400T and 400B located between ceiling 140 and floor 160, three clutch circuits 600L, 600C, 600R comprising correspondingly only one engagement assembly and one reversal assembly each 700L, 701L, 700C, 701C, 700R, 701R identical correspondingly to assemblies 700LT, 701LT, 700CT, 701CT, 700RT, 701RT seen in FIGS. 35-37, and wire conduit 840 (for clarity, clutch circuit 600C and reversal assembly 701C are not shown in FIG. 41). Assemblies 700L, 701L, 700C, 701C, 700R, 701R are attached to floor 160 correspondingly via inner races of ball bearings 190L, 191L, 190C, 191C, 190R, 191R.

In operation (referring to clutch by-wire 102), if clutch circuits 600L and 600R are to receive the rotational movement simultaneously, the controller (not shown) switches solenoid circuits 400T, 400B to the navigational position and rotates them around axis 230 until left-most of solenoids 400T, 400B (let us presume solenoid circuit 400T is left-most) is aligned with left-most of desired clutch circuits 600L; then the controller switches solenoid 400T to the neutral position and then rotates solenoid 400B until solenoid 400B is aligned with clutch circuit 600R; then the controller switches solenoids 400T and 400B to the engagement positions and turns on motor 220 to transfer the rotational movement of rotor 240 to clutch circuits 600L and 600R simultaneously. There is virtually no limit to improvement of the controller's algorithm. For instance, the controller may transfer other solenoids in the navigational positions to the engaged positions if other solenoids are aligned with their clutch circuits before left-most solenoid is aligned with its clutch circuit.

Figure 42:
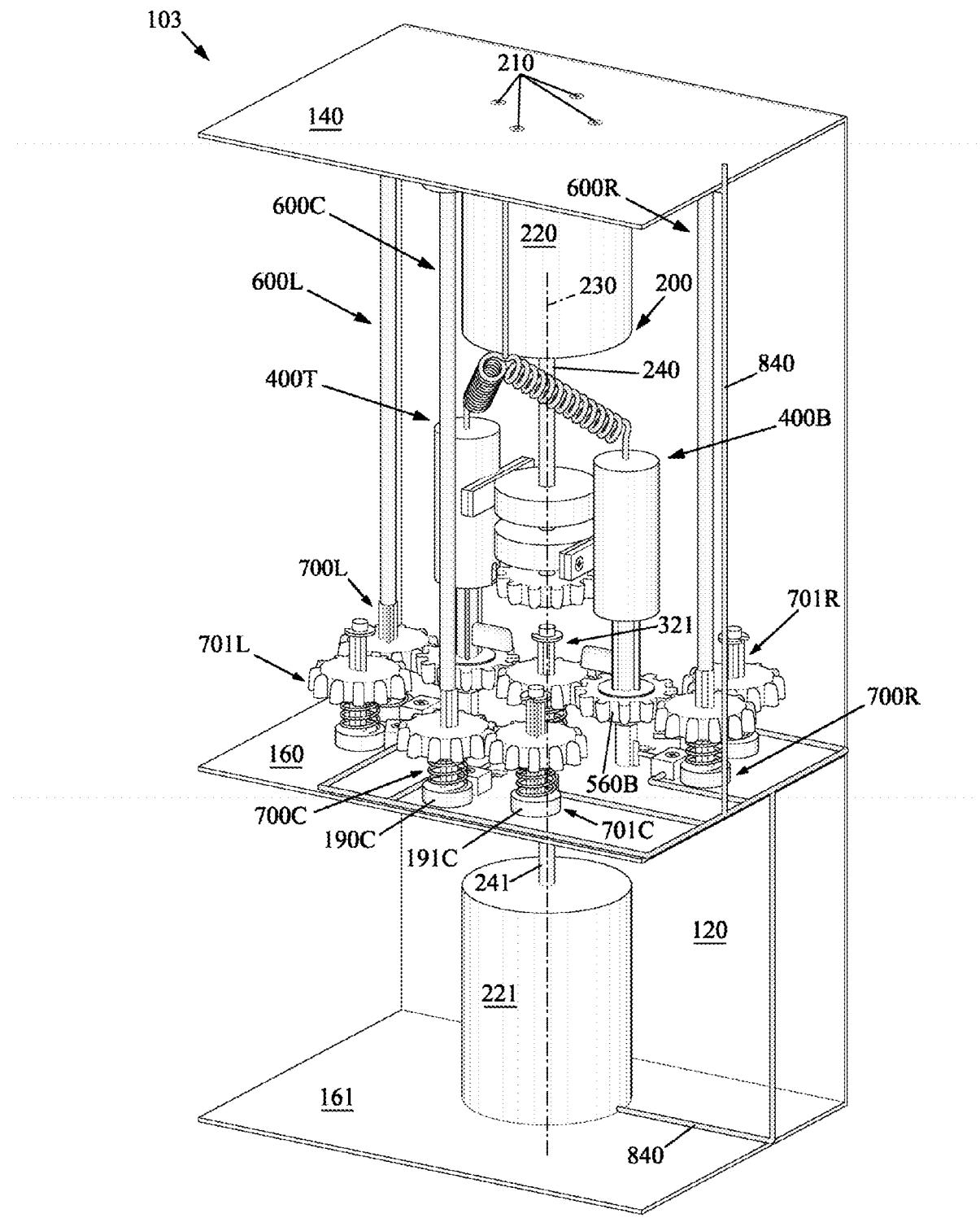
FIG. 42 is a perspective view of a clutch by-wire sample embodiment similar to clutch by-wire depicted in FIG. 40, but modified in such way that all of the clutch circuits of a combination of clutch circuits receiving the rotational movement simultaneously do not have to be stopped if they are part of the next combination of clutch circuits for receiving the rotational movement simultaneously.
Figure 43:
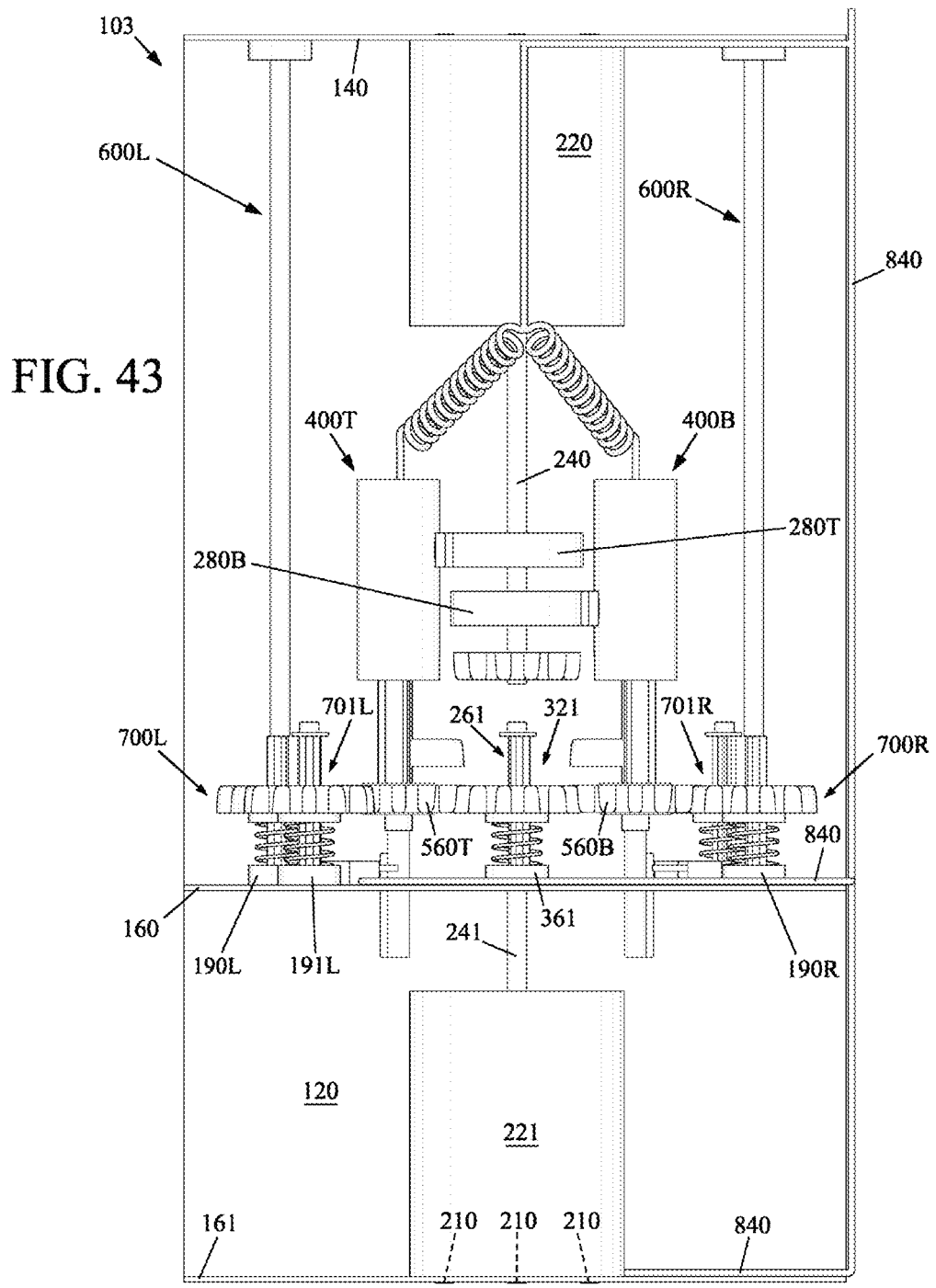
FIG. 43 is a front view of the clutch by-wire sample embodiment depicted in FIG. 42 without the center clutch circuit and the center reversal assembly.

Clutch by-wire 103 depicted in FIGS. 42 and 43 is similar to clutch by-wire 102, but it is modified in such way that all of the clutch circuits of a combination of clutch circuits receiving the rotational movement simultaneously do not have to be stopped if they are part of the next combination of clutch circuits for receiving the rotational movement simultaneously.

Clutch by-wire 103 depicted in FIGS. 42 and 43 is the same as clutch by-wire 102 depicted in FIGS. 40 and 41 with the following exceptions: added floor 161 to encasing 120, added motor 221 comprising rotor 241 rotated around the same axis 230 as rotor 240 of motor 220, buffer assembly 320 is removed, buffer assembly 321 identical to reversal assemblies 701L, 701C, 701R is added. Motor 221 is attached to floor 161 via fasteners 210. Buffer assembly 321 is attached via ball bearing 361 to floor 160 in the same way as reversal assemblies 701L, 701C, 701R. Three-rib section 261 of buffer assembly 321 is connected to rotor 241 passing through floor 160. Motor 221 is connected to the controller (not shown) via wire conduit 840.

Referring to clutch by-wire 103, clutch circuits 600L, 600C, and 600R receive the rotational movement from motor 221 via buffer assembly 321; and motor 220 only positions solenoids 400T, 400B in front of clutch circuits 600L, 600C, or 600R when solenoids 400T, 400B are in navigational positions (for clarity, clutch circuit 600C and reversal assembly 701C are not shown in FIG. 43). If, for instance, clutch circuits 600L, 600C are receiving simultaneously the rotational movement from motor 221 correspondingly via solenoid gears 560T, 560B; and it is desired to engage clutch circuits 600L, 600R next, the controller (not shown) switches solenoid 400B to a navigational position where clutch circuit 600C stops receiving the rotational movement of motor 221 via solenoid gear 560B, while clutch circuit 600L continues to receive the rotational movement of motor 221 via solenoid gear 560T. The controller then turns on motor 220 and after solenoid 400B is positioned in front of clutch circuit 600R, the controller switches solenoid into an engagement position resulting in clutch circuit 600R starting to receive the rotational movement of motor 221 via solenoid gear 560B simultaneously with clutch circuit 600L.

A sample embodiment of a clutch by-wire 104 depicted in FIGS. 44-48 demonstrates how at least one solenoid is sufficient for selecting any combination of clutch circuits for receiving rotary movement simultaneously, wherein a direction of rotary movement received by any circuit does not depend on directions of rotary movement received by other circuits of the combination.

Clutch by-wire 104 comprises a motor circuit 910 (see FIG. 45) comprising a motor 912 having a motor shaft comprising a round section 914 with a navigational gear 916 secured thereon and an externally splined section 918 engaged with a complementary throughout splined channel of shaft 920 having a disk 922 secured at the top end of the splined channel and an engagement gear 924 secured at the other end thereof, wherein shaft 920 is biased from motor 910 along splined section 918 by a compression spring 926 and is prevented from falling off splined section 918 by a disk 928 secured to the end of splined section 918.

Figure 45:
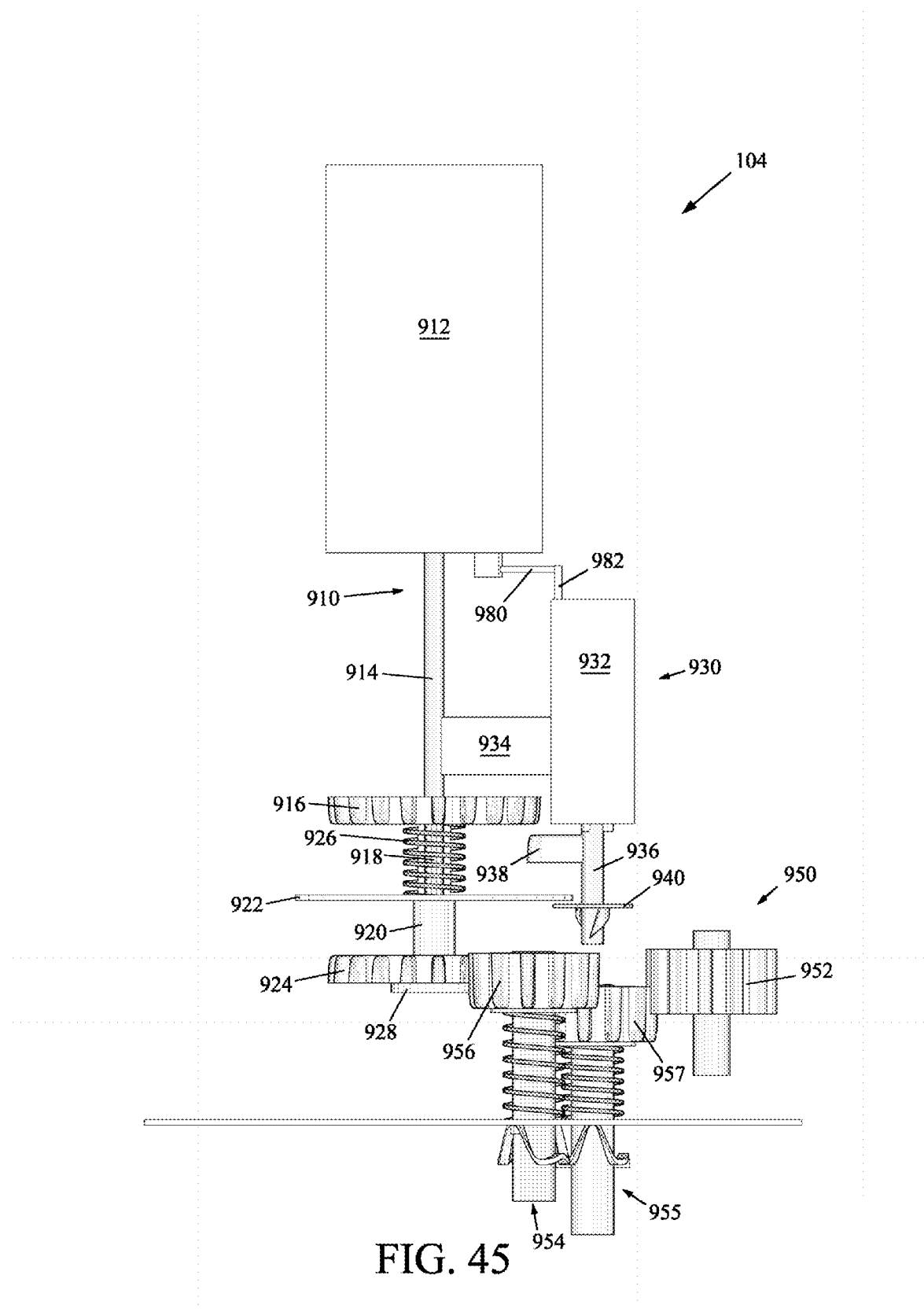
FIG. 45 is a front view of the clutch by-wire sample embodiment depicted in FIG. 44 shown with one rotary clutch circuit.

Clutch by-wire 104 also comprises one solenoid circuit 930 comprising one three-position solenoid 932 secured to round section 914 by a rib 934. Solenoid 932 comprises an armature 936 having a pin 938, a disk 940, and a shaft 942 with two actuators 944 secured on its ends and pivotal there about (best seen in FIG. 46); each actuator 944 is biased toward disk 940 by a torsion spring 946 off shaft 942. Solenoid 932 is in a neutral position when not powered by a controller as shown in FIG. 45 where pin 938 is disengaged from navigation gear 916 and disk 940 is distant from disk 922 (the controller is not shown).

Figure 44:
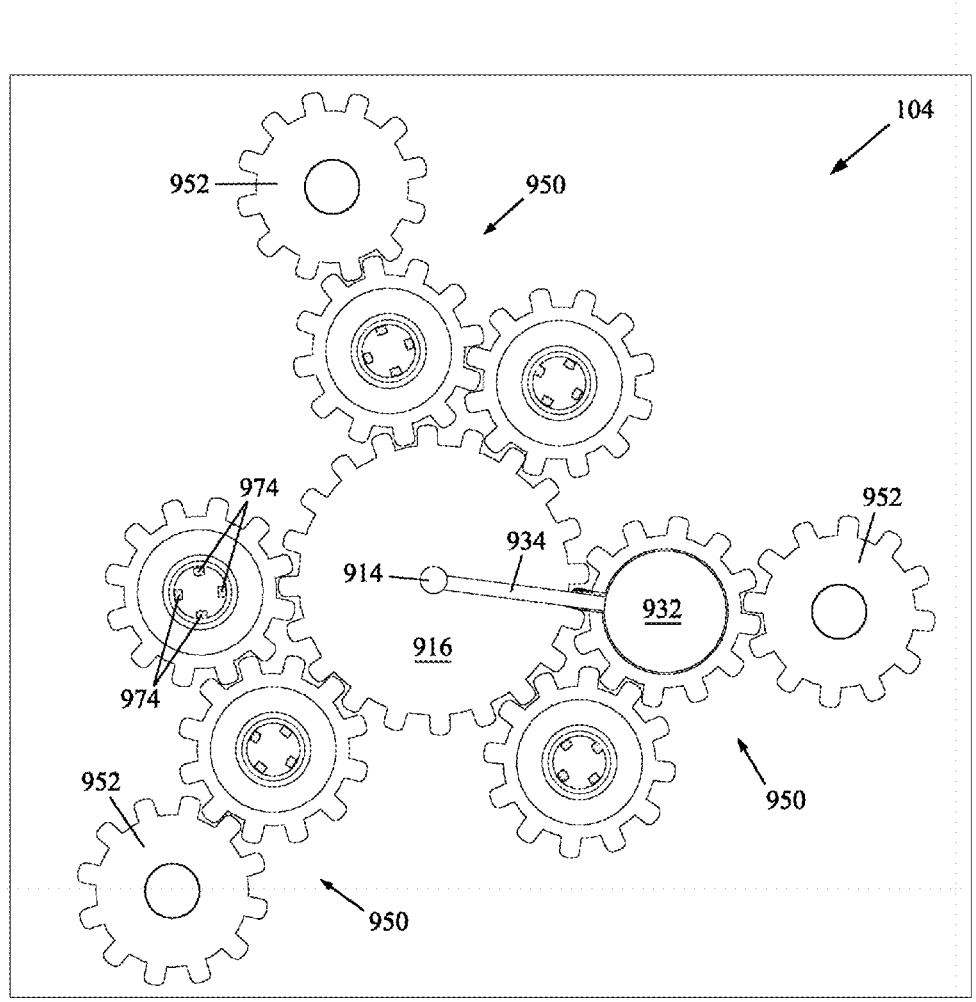
FIG. 44 is a top view of a clutch by-wire sample embodiment demonstrating how at least one solenoid is sufficient for selecting any combination of clutch circuits for receiving rotary movement simultaneously.

Clutch by-wire 104 further comprises three rotary clutch circuits 950 (FIG. 44). Each clutch circuit 950 comprises an output gear 952 on a shaft (shown partially for clarity) and two identical input circuits 954, 955 engaged with each other respectively by gears 956 and 957 (best seen in FIG. 45), wherein gear 957 is also engaged with gear 952, where the teeth of gears 952, 956, and 957 are also utilized as splines for permitting rotary engaged gears 956 and 957 to move linearly about each other without loosing their rotary engagement including rotary engagement between gear 957 and gear 952. Since input circuits 954 are 955 are identical, only circuit 955 will be described (best seen in FIG. 46). In addition to gear 957, circuit 955 also comprises a hollow shaft 958 having two opposite external tabs 960 at one end and four internal wheels 974 at the other end, shaft 958 is secured inside of the inner race of a bearing 962, wherein gear 957 is secured to the outer race. Shaft 958 is slidably disposed in a hole 964 and between lower traps 972 of the encasing such that it is biased toward the armature 936 by a compression spring 970 and is kept from escaping the encasing by tabs 960 capable of engaging with either lower traps 971 or higher traps 972 of the encasing. Spring 970 is positioned between the encasing and the inner races of bearing 962. Wheels 974 are distant by a ninety degree step around the inner circumference of shaft 958 and are pivotal about shafts secured to the inner wall of shaft 958.

Clutch by-wire 104 further comprises six rigid electrical contacts 980 aligned with shafts 958 (one per each), secured to, and electrically isolated from, the body of motor 912. Clutch by-wire 104 furthermore comprises a spring bar 982 which is also used as an electrical contact secured to, and electrically isolated from, the body of solenoid 932. Contacts 980 and 982 are connected to the controller by wires (not shown for clarity). Although each contact 980 may be individually wired as a controller input (see FIG. 47), in order to minimize the number of inputs, all contacts 980 but one may be wired as a single input as demonstrated in FIG. 48 where the excluded contact 980 is served for indicating a reset position, for instance when the controller is powered, for counting a destination position by the number of connections made with other contacts 980 after the reset position when the controller navigates solenoid 932.

In use (referring to clutch by-wire 104), the controller is capable of switching solenoid 932 from the neutral position to a navigational position where pin 934 gets engaged with navigational gear 916 for aligning solenoid 932 with any gear 956 or gear 957 by rotating gear 916 until contact 982 touches a destination contact 980. In addition, disk 940 raises shaft 920 by disk 922 raising also engagement gear 924 and compressing spring 926 in the navigational position such that engagement gear 924 is positioned above any gear 956 and 957 regardless whether tabs 960 are secured in lower traps 971 or higher traps 972 for preventing transfer of the motor rotary movement to any clutch circuit 950 in the navigational position.

Referring to clutch by-wire 104, the controller is also capable of switching solenoid 932 from the neutral position to an engagement position when solenoid 932 is aligned with any one shaft 958 by moving armature 936 toward the aligned circuit; as the result, actuators 944 press onto a pair of opposite wheels 974 causing shaft 958 to move linearly, while also making a ninety degrees turn, which compresses spring 970. When the controller switches solenoid 932 from the engagement position to the navigational position, the decompression force of spring 970 traps tabs 960 in a different type of the traps: from higher traps 972 to lower traps 971 or vice versa, wherein engagement of tabs 960 with higher traps 972 means selecting, and engagement of tabs 960 with lower traps 971 means deselecting, any input circuit 954 or 955; in the same time the other pair of opposite wheels 974 pivots actuators 944 compressing torsion springs 946 when shaft 936 is on the way up back to the neutral or navigational position without rotating shaft 958 since combined compression force of torsion springs 946 is much less than the decompression force of spring 970; and when wheels 974 become lower than actuators 944, the decompression forces of torsion springs 946 return actuators 944 back to the initial biased position making them ready for the next ninety degrees turn when shaft 936 is switched again to the engagement position. Thereby solenoid 932 is capable of toggling a selection status of any one of the input circuits 954 and 955 aligned therewith every time the controller switches solenoid 932 to the engagement position. Accordingly, the controller is capable of selecting any combination of clutch circuits 950 for receiving the motor rotary movement simultaneously since gears 956 and 957 of the selected circuits are engaged with engaging gear 924; and the controller is programmed such that only one of input circuits 954, 955 of each clutch circuit 950 is selected at a time permitting to set a desired direction for rotating output gear 952 of any selected clutch circuit 950 depend on which of input circuits 954, 955 is selected when gear 924 is rotated; in addition, the controller is programmed to bring solenoid 932 to the neutral position before dispersing rotary movement to the selected clutch circuits.

As was demonstrated, clutch by-wire 104 is similar to the embodiments 101-103 except that solenoid 932 is not participating as a link for transferring a rotary movement but rather as a switch for selecting and deselecting clutch circuits 950 capable of receiving rotary movement of motor circuit 910 directly when selected.

Figure 49:
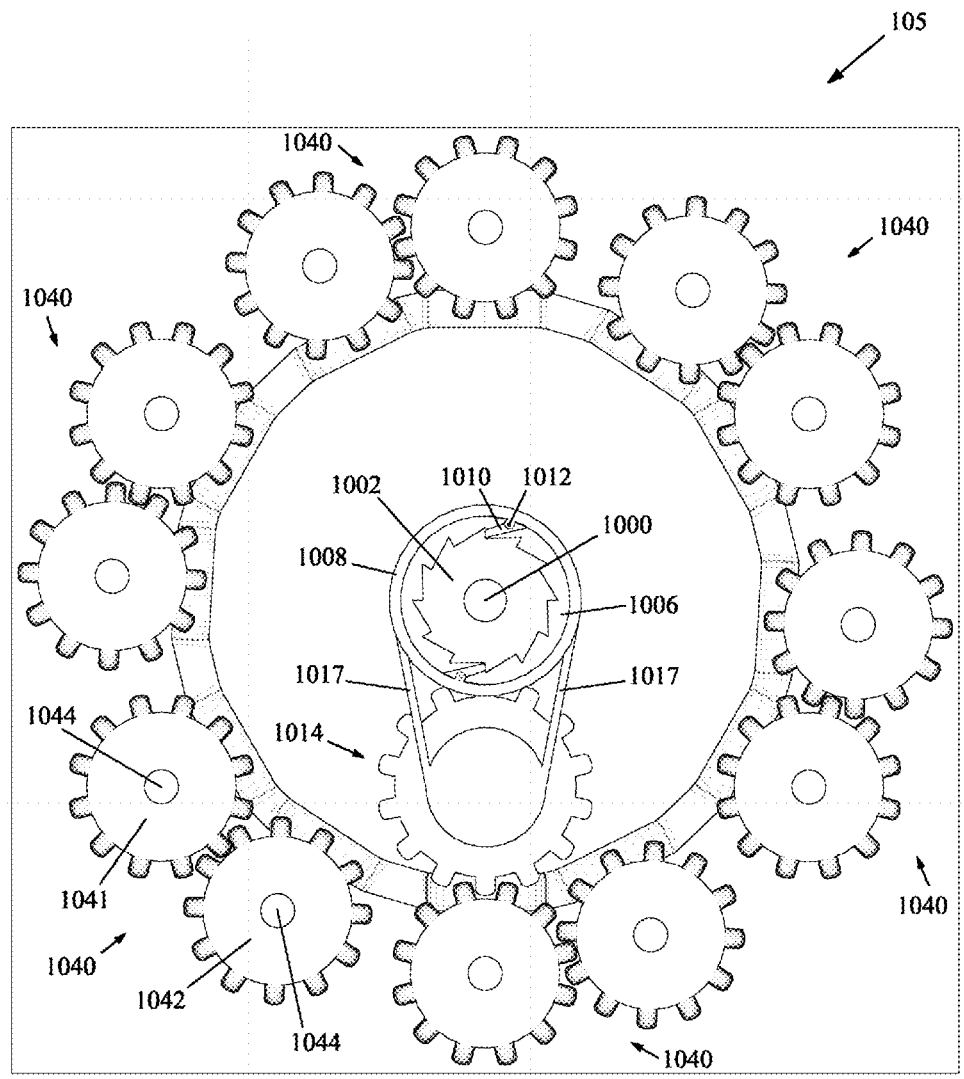
FIG. 49 is a top view of a clutch by-wire sample embodiment demonstrating how a solenoid as an actuator can be eliminated when simultaneous rotation of a plurality of clutch circuits is not required.
Figure 50:
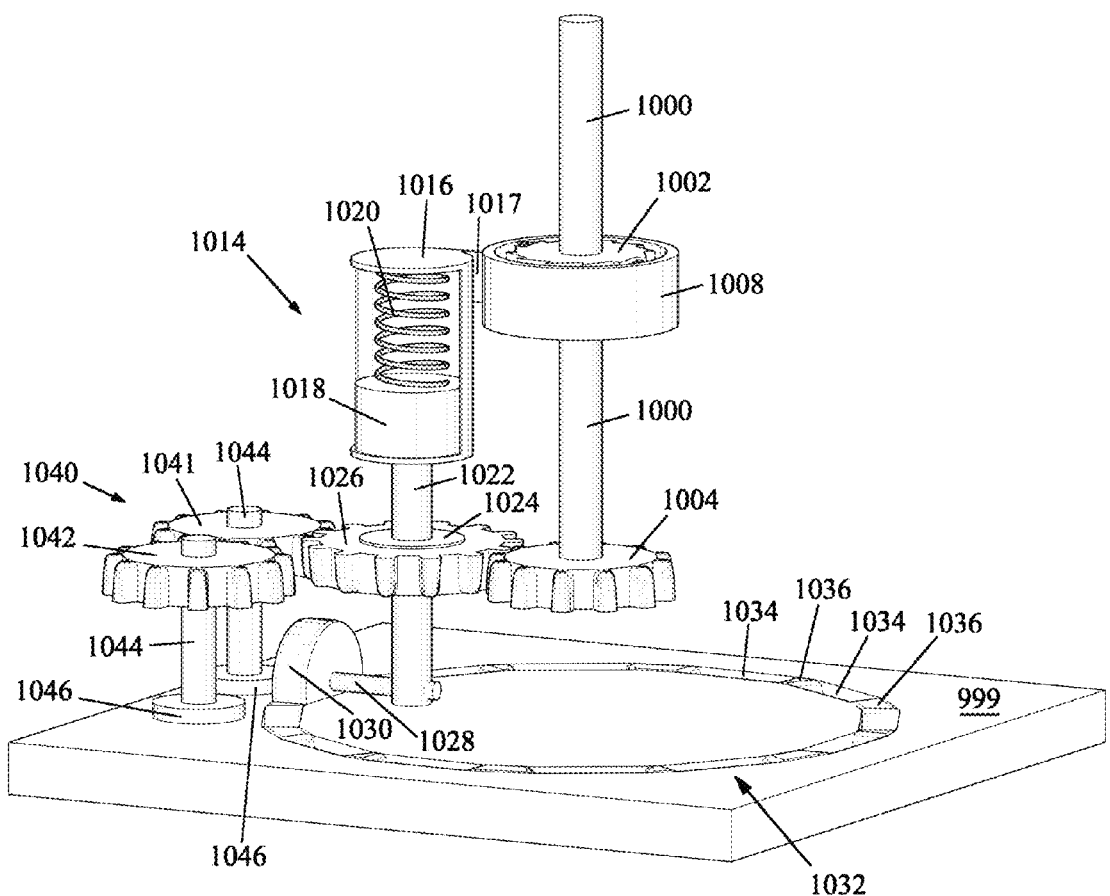
FIG. 50 is a perspective view of the clutch by-wire sample embodiment depicted in FIG. 49 shown with one clutch circuit.
Figure 51:
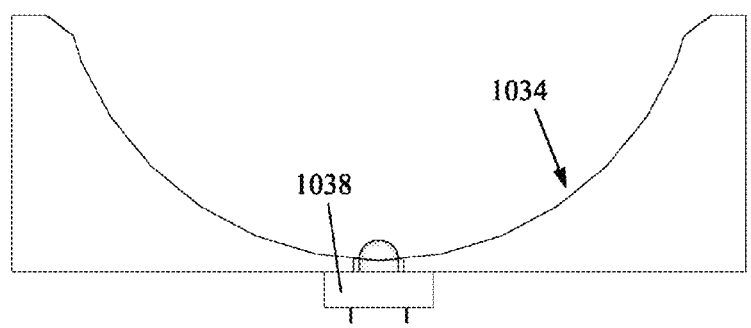
FIG. 51 is a front view of a valley of the track depicted in FIGS. 49 and 50 shown with a push electric switch.

When simultaneous rotation of a plurality of clutch circuits is not required, a solenoid as an actuator can be eliminated as demonstrated by a sample embodiment of a clutch by-wire 105 depicted in FIGS. 49-51.

Clutch by-wire 105 comprises a rotary shaft 1000 rotated, for instance, by a motor (not shown). Rotary shaft 1000 comprises a disk 1002 and an engaging gear 1004 (see FIG. 50). Rotary shaft 1000 is secured inside of the inner races of a bearing 1006, wherein a hollow cylinder 1008 is secured around the outer races. Disk 1002 comprises asymmetric teeth, and cylinder 1008 comprises two latches 1010 pivotal about axes 1012 such that rotating cylinder 1008 is permitted only counter clockwise by latches 1010 in respect to FIGS. 49 and 50; latches 1010 are biased toward disk 1002 by torsion springs (not shown for clarity).

Clutch by-wire 105 also comprises an actuator 1014 (best seen in FIG. 50) comprising a hollow cylinder 1016 with a plunger 1018 biased by a compression spring 1020 there out; the external shaft 1022 of plunger 1018 is secured inside of the inner races of a bearing 1024, wherein a transfer gear 1026 is secured around the outer races. The bottom portion of external shaft 1022 has a shaft 1028 perpendicular thereto and oriented toward rotary shaft 1000. Shaft 1028 comprises a wheel 1030 pivotal there about and adapted to follow a circular track 1032 of an encasing 999 when shaft 1022 is rotated. Hollow cylinder 1016 is secured to hollow cylinder 1008 by two ribs 1017 (only one rib 1017 is shown in FIG. 50 for clarity).

Clutch by-wire 105 further comprises six clutch circuits 1040 arranged equidistantly about rotary shaft 1000. Each clutch circuits 1040 comprises a gear 1041 engaged with one identical gear 1042, wherein each of gears 1041 and 1042 is secured on a shaft 1044 secured pivotally about the encasing 999 by a bearing 1046, wherein track 1032 comprises a valley 1034 in front of each gear 1041 or 1042 and a hill 1036 between any adjacent pair of gears 1041, 1042. Each valley 1034 comprises a push electric switch 1038 (see FIG. 51). Although each switch 1038 may be individually wired as a controller input, in order to minimize the number of inputs, all switches 1038 but one may be wired as a single input similarly as was demonstrated in FIG. 48 where the excluded switch is served for indicating a reset position, for instance when the controller is powered, for counting a destination position by the number of connections made with other switches after the reset position when the controller navigates actuator 1014.

In use (referring to clutch by-wire 105), a controller (not shown) is able to rotate actuator 1014 counter clockwise (since actuator 1014 is engaged with shaft 1000 by latches 1010) compressing spring 1020 when wheel 1030 is on a hill 1036 where gear 1026 is disengaged from gear 1004 and any gear 1041, 1042 since it is above thereof; and when wheel 1030 is in a valley 1034, gear 1026 gets engaged with gear 1004 and with a corresponding gear 1041 or 1042. Thereby, the controller is capable of transmitting clockwise rotary movement of rotary shaft 1000 to any one clutch circuit 1040 without changing position of actuator 1014 since the actuator is not secured to rotary shaft 1000 by latches 1010 in case of clockwise rotary movement of rotary shaft 1000, wherein submitting clockwise rotary movement of shaft 1000 to a gear 1042 will result in a reversal rotary movement of gear 1041 of a same circuit 1040 when compared to submitting the clockwise rotary movement directly to gear 1041.

Figure 52:
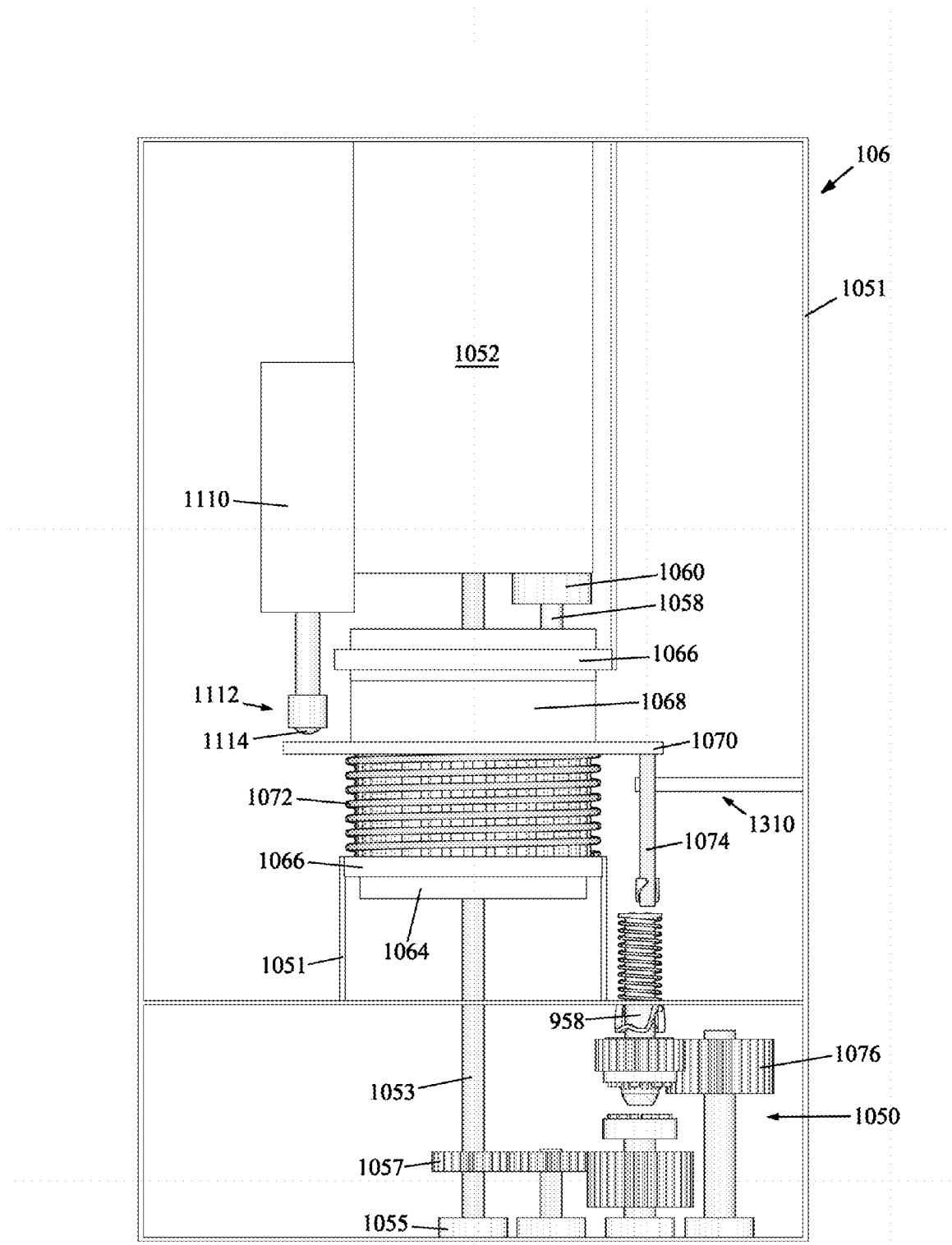
FIG. 52 is a front view of a clutch by-wire sample embodiment which does not require stopping an input rotary source thereof when changing a selection status of any clutch circuit by an actuator.
Figure 53:
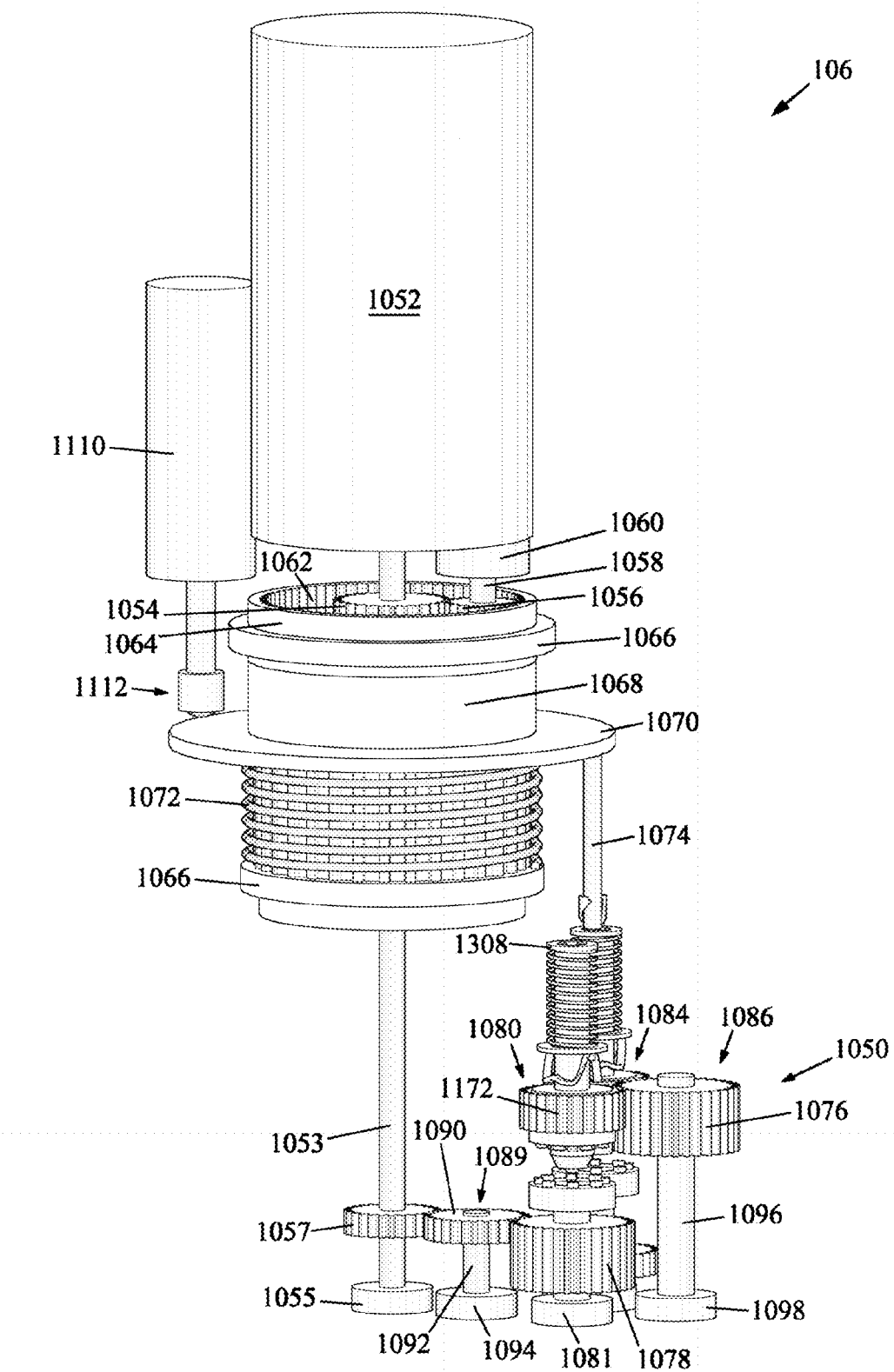
FIG. 53 is a perspective view of the clutch by-wire depicted in FIG. 52.

A clutch by-wire 106 depicted in FIGS. 52-57 demonstrates changing of a selection status of clutch circuits 1050 when stopping a rotary source is not desirable (although only one circuit 1050 is demonstrated for clarity, it is expected that a plurality of circuits 1050 will be arranged around, and equidistantly from, shaft 1053). Clutch by-wire 106 comprises a motor 1052 having a rotary shaft 1053 secured in the inner race of an axial bearing 1055, wherein the outer race and the body of motor 1052 are secured to an encasing 1051. Rotary shaft 1053 comprises a gear 1057 and a gear 1054 (FIG. 53). Gear 1054 is meshed with a gear 1056 secured on a rotary shaft 1058 secured in the inner race of an axial bearing 1060, wherein the outer race is secured to the body of motor 1052. Gear 1056 is also meshed with an internal gear 1062 located in the upper portion (in respect to the figures) of a hollow cylinder 1064 secured between inner races of two axial bearings 1066; wherein the outer races are secured to encasing 1051 (the securing ribs of the encasing are not shown for clarity). Cylinder 1064 also comprises an exterior splined section meshed with a splined channel of a hollow cylinder 1068 having a disk 1070 and biased toward motor 1052 by a compression spring 1072 located between disk 1070 and the inner race of bearing 1066. Clutch by-wire 106 also comprises a solenoid 1110 secured to the body of motor 1052. Solenoid 1110 comprises a ball socket 1112 housing a ball 1114 (FIG. 52). A controller and wiring of solenoid 1110 and motor 1052 thereto is not shown for clarity.

Referring to clutch by-wire 106, each clutch circuit 1050 comprises an input circuit 1089, a transfer circuit 1080, a reversal circuit 1084, and an output circuit 1086. Input circuit 1089 comprises a gear 1090 on a rotary shaft 1092 secured inside of the inner race of an axial bearing 1094, wherein the outer race is secured to encasing 1051 (not shown how for clarity); gear 1090 is meshed with gear 1057.

Referring to clutch by-wire 106, output circuit 1086 comprises a gear 1076 on a rotary shaft 1096 secured inside of the inner race of an axial bearing 1098, wherein the outer race is secured to encasing 1051 (not shown how for clarity).

Referring to clutch by-wire 106, transfer circuit 1080 (best seen in FIG. 54) comprises a gear 1078 on a rotary shaft 1079 secured inside of the inner race of an axial bearing 1081, wherein the outer race is secured to encasing 1051 (not shown how for clarity); gear 1078 is meshed with gear 1090 of input circuit 1089.

Referring to clutch by-wire 106, reversal circuit 1084 comprises a gear 1082 on a rotary shaft 1083 secured inside of the inner race of an axial bearing 1085, wherein the outer race is secured to encasing 1051 (not shown how for clarity); gear 1082 is meshed with gear 1078 of transfer circuit 1080.

Referring to clutch by-wire 106, each transfer circuit 1080 and each reversal circuit 1084 comprises a pair of electrical contacts 1310 (seen in FIGS. 52 and 56) aligned therewith and secured inside of encasing 1051 (FIG. 52); the controller and wiring of contacts 1310 thereto is not shown for clarity.

Referring to clutch by-wire 106, transfer circuit 1080 further comprises a clutch 1100, and reversal circuit 1080 further comprises a clutch 1102 identical to clutch 1100. For shortening the description, only clutch 1100 (best seen in FIG. 57) will be described.

Figure 46:
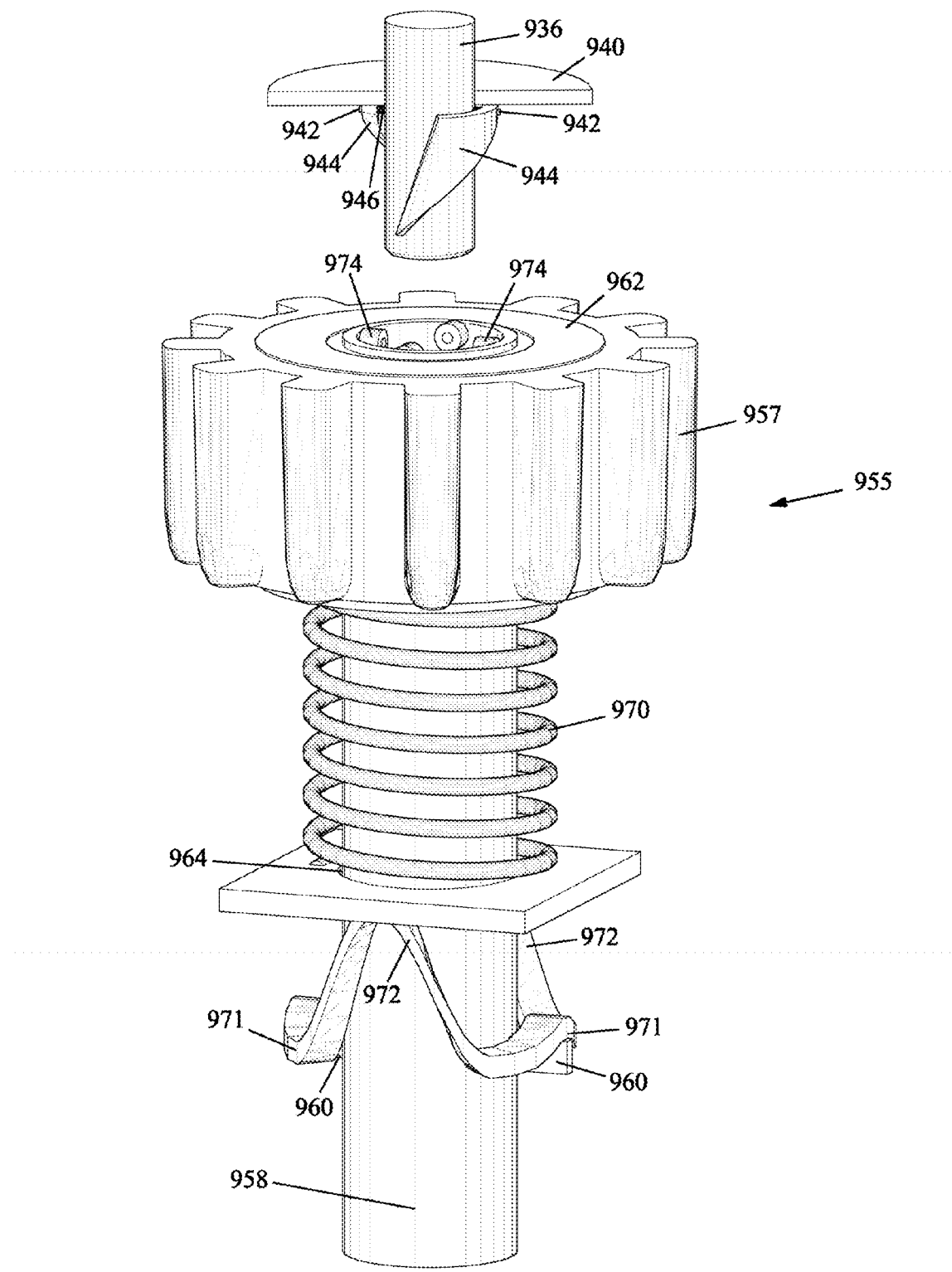
FIG. 46 is a partial perspective view of the armature of the solenoid and one of the input circuits depicted in FIG. 45.
Figure 47:
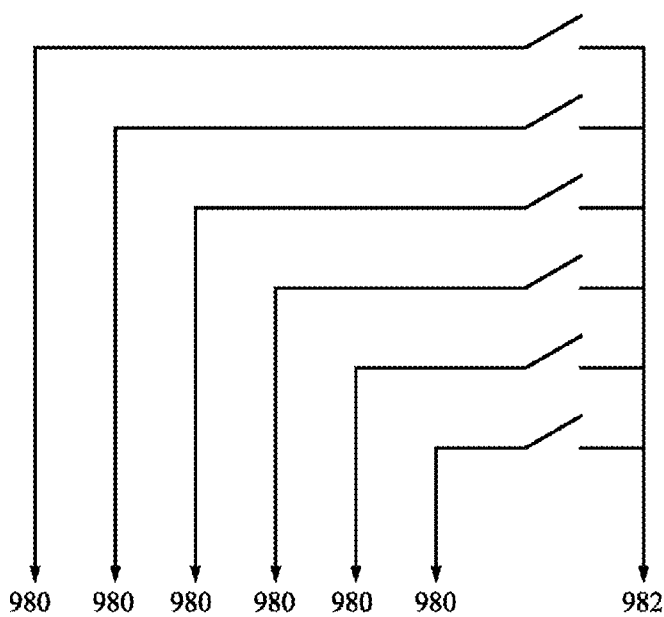
FIG. 47 is a diagram demonstrating a method of wiring of position sensors which requires a larger number of controller inputs.
Figure 48:
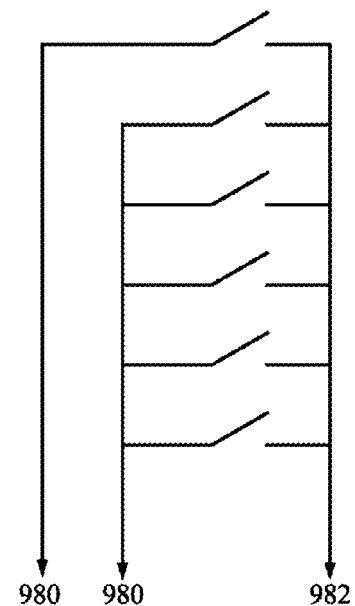
FIG. 48 is a diagram demonstrating a method of wiring of position sensors which requires a lesser number of controller inputs.

Referring to clutch by-wire 106, transfer circuit 1080 furthermore comprises a toggle assembly 1300, and reversal circuit 1080 furthermore comprises a toggle assembly 1302 identical to toggle assembly 1300. Toggle assembly 1300 is similar to input circuit 955 depicted in FIG. 46 and described previously except one end of spring 970 is limited by a disk 1308 (FIG. 54) instead of bearing 962 (FIG. 46).

Referring to clutch by-wire 106, clutch 1100 comprises a disk 1194 and a hollow cylinder 1200. Disk 1194 of transfer circuit 1080 is secured on rotary shaft 1079, and disk 1194 of reversal circuit 1084 is secured on rotary shaft 1083; on a side not secured to a shaft, disk 1194 comprises dog teeth 1196 circularly arranged around its periphery and a conically shaped opening 1198.

Referring to clutch by-wire 106, cylinder 1200 is secured on the outer race of an axial bearing 1304, wherein the inner race secures a rotary shaft 958. Cylinder 1200 comprises on exterior a gear 1172 meshed with gear 1076 of output circuit 1086.

Referring to clutch by-wire 106, on a side opposite to shaft 958, cylinder 1200 comprises dog teeth 1218 arranged around its periphery and a splined channel 1220. Cylinder 1200 hosts a cylindrical synchronizer 1222 comprising a conical end 1204 and a splined section 1224 slidably engaged with splined channel 1220. Synchronizer 1222 is urged by a compression spring 1226 from cylinder 1200 toward conically shaped opening 1198 by conical end 1204 shaped complementary thereto.

Figure 54:
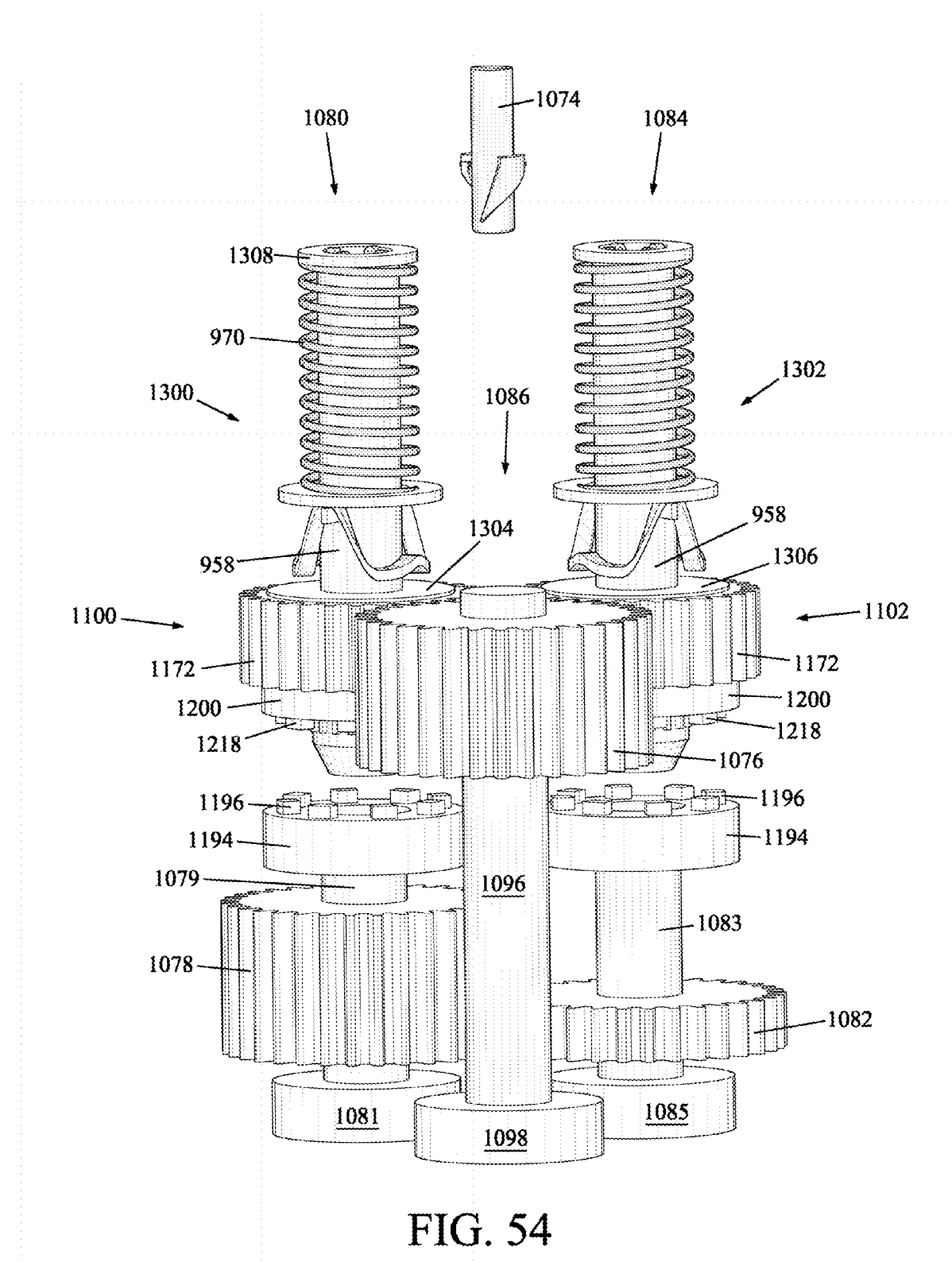
FIG. 54 is a partial perspective view of the transfer, reversal, and output circuits depicted in FIG. 52.
Figure 55:
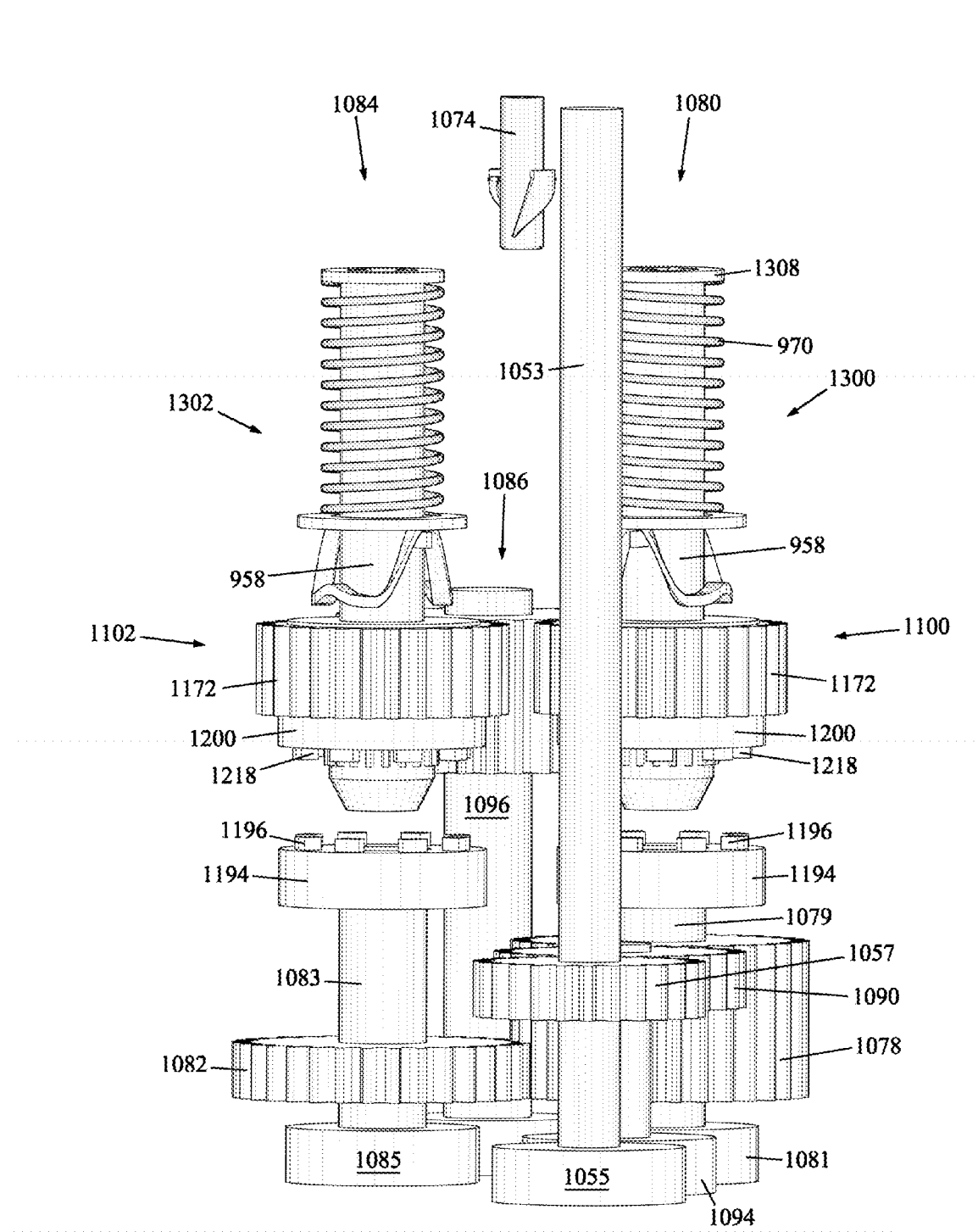
FIG. 55 is a partial perspective view of the motor rotary shaft and of the input, transfer, reversal, and output circuits depicted in FIG. 52.
Figure 56:
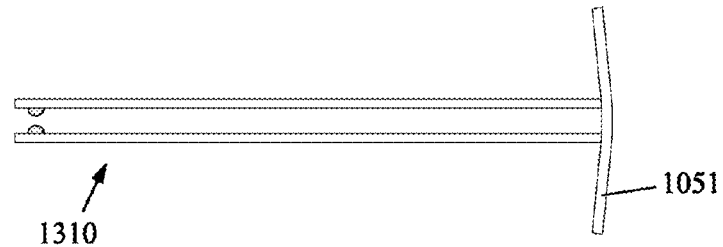
FIG. 56 is a top view of a pair of electrical contacts depicted in FIG. 52.
Figure 57:
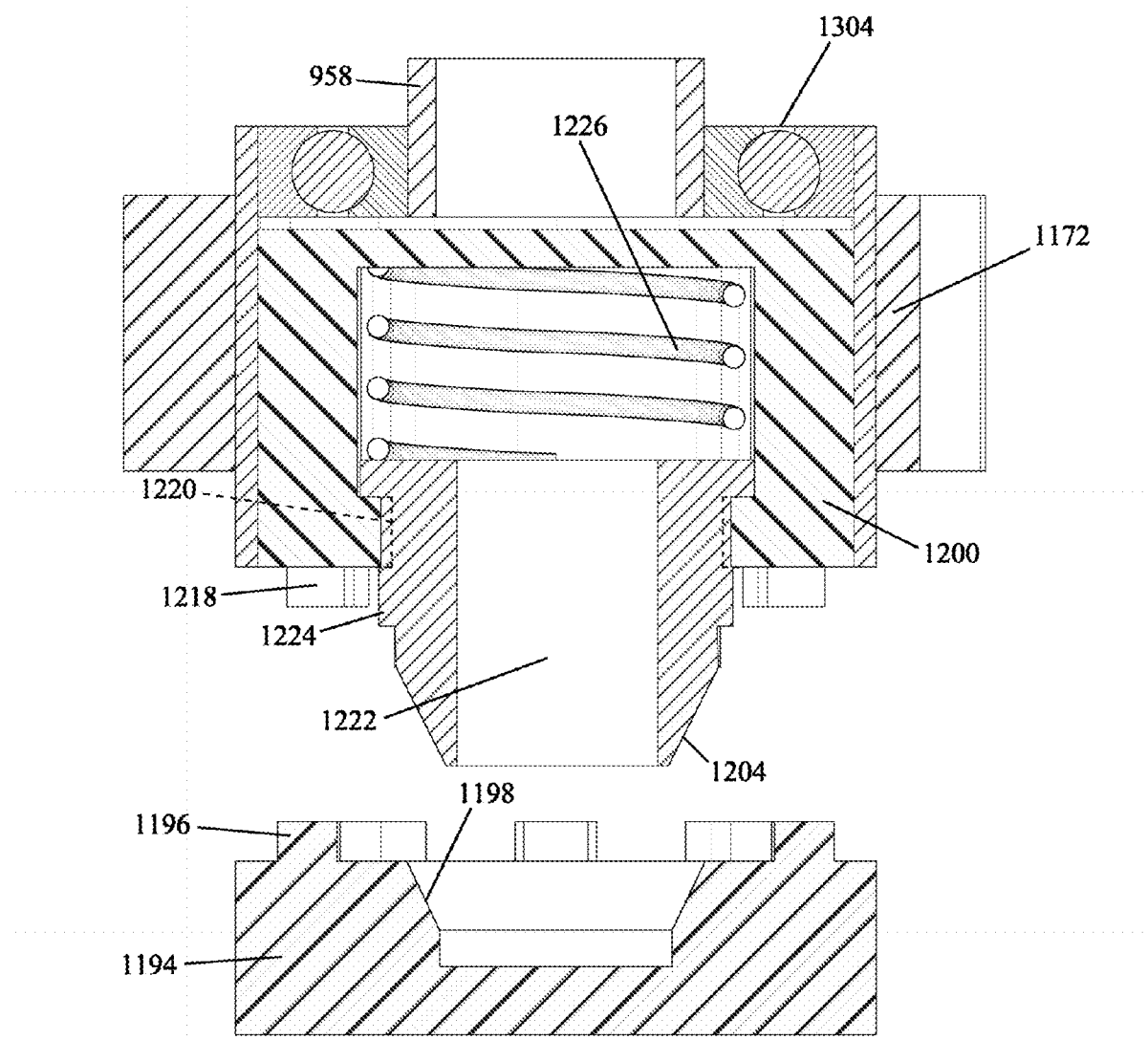
FIG. 57 is a sectional view of a clutch depicted in FIG. 52.

In use (referring to clutch by-wire 106), shaft 1053 of motor 1052 is rotated constantly in a same direction transmitting rotary movement from gear 1057 to gear 1090, to gear 1078 (shaft 1079) and to gear 1082 (shaft 1083) rotated in opposite directions, and to two disks 1194 also rotated in opposite directions thereby. In addition, rotary movement of shaft 1053 is constantly transmitted to gear 1054, 1056, and gear 1062 (best seen in FIG. 53) rotating cylinder 1068, disk 1070, and shaft 1074, wherein shaft 1074 is rotated around, and slower than, shaft 1053 due to a reduction of meshed smaller gear 1056 and larger gear 1062, wherein shaft 1074 closes contacts of pairs 1310 in turn (one pair 1310 at a time) when shaft 1074 gets aligned with the corresponding shaft 958 (shafts 958 are best seen in FIG. 54). The controller is programmed to engage solenoid 1110 for a short period of time for switching any clutch 1100 or 1102 between an engaged state and a disengaged state when a closed pair of contacts 1310 signals to the controller that a desired clutch (1100 or 1102) is reached. Switching of solenoid 1110 to an engaged position results in extending the armature of solenoid 1110 out of its body pressing by ball 1114 onto disk 1070 toward clutch circuit 1050 aligned therewith while rolling ball 1114 along disk 1070 for reducing friction; as the result, shaft 1074 is moved down until engaging toggle assembly 1300 (or 1302) moving cylinder 1200 toward disk 1194 which makes synchronizer 1222 to engage with opening 1198 causing rotation of cylinder 1200 due to splined engagement with synchronizer 1222 disposed in splined channel 1220; further movement of cylinder 1200 toward disk 1194 causes compression of spring 1226 and engagement between dog teeth 1218 and 1196 without damaging thereof due to close speeds of disk 1194 and cylinder 1200 bringing clutch 1100 (or clutch 1102) into the engaged position. When the controller powers solenoid 1110 off, cylinder 1200 is moved away from disk 1194 under decompression force of spring 1226 until dog teeth 1218 and 1196 get disengaged firstly and synchronizer 1222 is moved away from disk 1194 lastly for not damaging dog teeth 1218 and 1196 due to the same or close speeds thereof. Rotary movement of motor 1052 is transferred to all transfer and reversal circuits 1080 and 1084 having respectively clutches 1100 and 1102 currently engaged, wherein the controller is programmed such that the clutches of transfer circuit 1080 and reversal circuit 1084 of a same clutch circuit 1050 are never engaged at the same time. Accordingly, when transfer circuit 1080 is selected by the controller, rotary movement of motor shaft 1053 is transferred along the following mechanical circuit: gear 1057, gear 1090, gear 1078, shaft 1079, disk 1194, dog teeth 1196 engaged with dog teeth 1218, cylinder 1200, gear 1172, and eventually gear 1076 of output circuit 1086. When reversal circuit 1084 is selected by the controller, rotary movement of motor shaft 1053 is transferred along the following mechanical circuit: gear 1057, gear 1090, gear 1078, gear 1082, shaft 1083, disk 1194, dog teeth 1196 engaged with dog teeth 1218, cylinder 1200, gear 1172, and eventually gear 1076 of output circuit 1086, wherein a direction of rotary movement received by gear 1076 is opposite to a direction submitted when transfer circuit 1080 is selected due to gear 1082 reversing movement of gear 1078 before submitting it to clutch 1102. Naturally, when clutches 1100 and 1102 of a same clutch circuit 1050 are disengaged, no transfer of rotary movement occurs thereto. Since selecting and deselecting any clutch circuit 1050 does not affect motor 1052 and any other clutch circuit 1050, a single motor is sufficient for deploying of a plurality of clutches by-wire 106.

Figure 58:
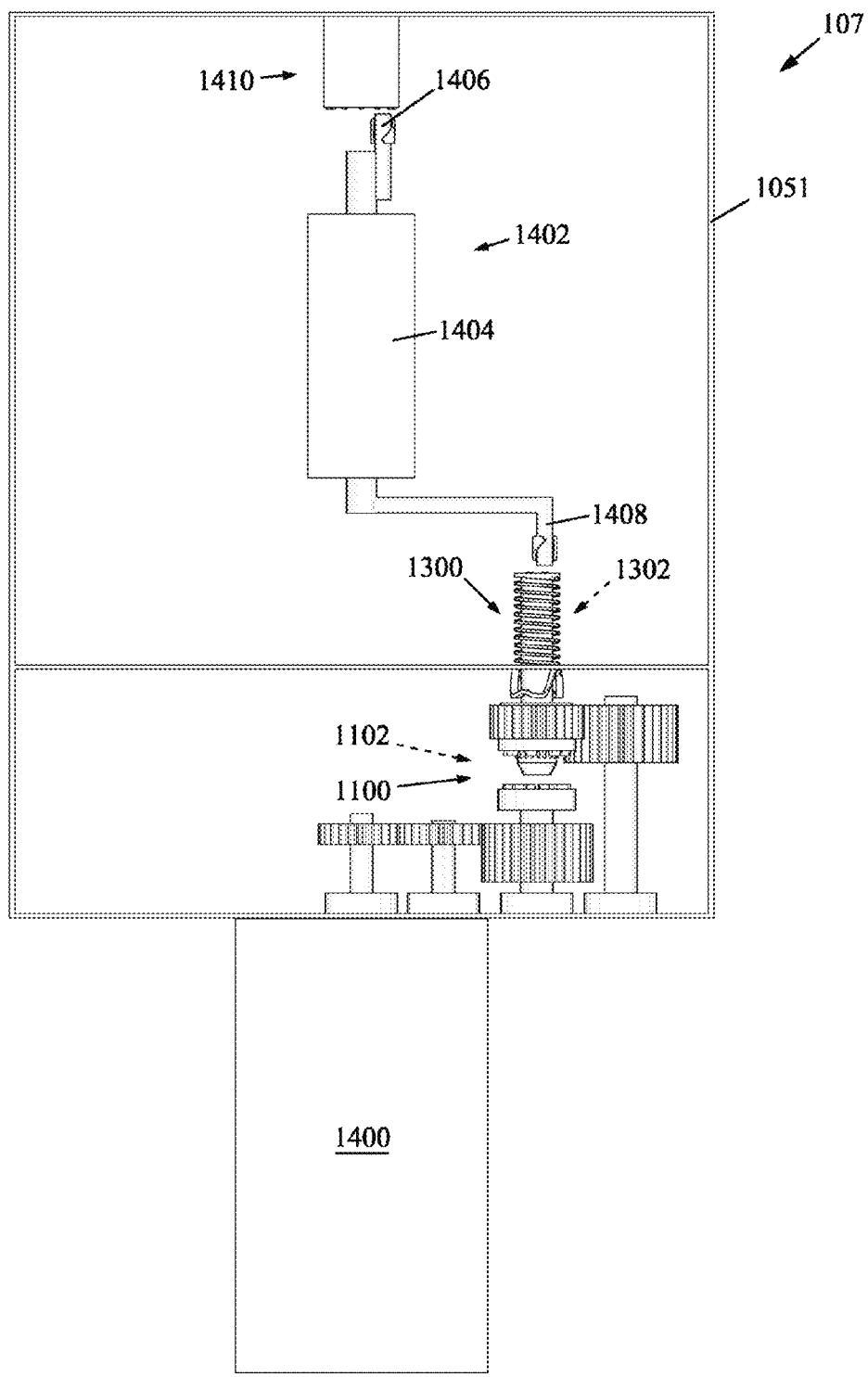
FIG. 58 is a perspective view of a clutch by-wire sample embodiment demonstrating that utilizing a motor for navigating between clutch circuits is not required.

Utilizing a motor for switching clutch circuits (as was described so far) is not a must; for instance, although a clutch by-wire 107 depicted in FIG. 58 comprises the same clutch circuits 1050 as clutch by-wire 106, and a motor 1400 is similarly always on as motor 1052 of clutch by-wire 106, clutch by-wire 107 comprises an additional toggle assembly 1410 and a different solenoid assembly 1402. Since embodiments 106 and 107 have many identical parts, the reference numbers of embodiment 106 are also used for describing the embodiment 107 for emphasizing the identity.

Referring to clutch by-wire 107, solenoid assembly 1402 comprises a three-position solenoid 1404 with the armature having on one end a toggle actuator 1408 (identical to actuator 944 described previously) for engaging toggle assembly 1300 or 1302 and having on the other end a toggle actuator 1406 similar to toggle actuator 1408 but for engaging with toggle assembly 1410, wherein the armature is located in a middle position when solenoid 1404 is not powered by the controller. Toggle assembly 1410 is similar to toggle assembly 1300 except a distance, defined hereinafter as a step, between any two adjacent wheels identical to wheels 974 (FIG. 46) is equal to a distance between center axes or rotary shafts 958 of a same clutch circuit 1050, wherein all clutch circuits 1050 are identical for clarity, and a distance between any two adjacent clutch circuits 1050 is equal to a predetermined number of the steps.

As the result (referring to clutch by-wire 107), a controller is capable of switching solenoid 1404 up from the middle position for engaging toggle actuator 1406 with toggle assembly 1410 resulting in rotation of actuator 1408 till next position around three hundred sixty degrees until aligned with a desired clutch 1100 or 1102 (although a must, pairs of contacts 1310 are not shown for clarity), wherein the controller is also capable of switching solenoid 1404 in the opposite direction from the middle position for engaging or for disengaging clutch 1100 (1102) as was described previously for clutch by-wire 106.

As the result (referring to clutch by-wire 107), the controller is capable of rotating solenoid 1404 three hundred sixty degrees for aligning with a desired clutch 1100 or 1102 (although a must, pairs of contacts 1310 are not shown for clarity), wherein each time the controller switches solenoid 1404 from the middle (not energized position) such that the solenoid's armature moves actuator 1406 toward, and engages it with, toggle assembly 1410 (first energized position), solenoid 1404 is moved by one step in a same direction. The controller is also capable of switching solenoid 1404 from the middle (not energized position) such that the solenoid's armature moves actuator 1408 toward, and engages it with, toggle assembly 1300 or 1302 aligned therewith (second energized position) for engaging or for disengaging, respectively, clutch 1100 or 1102 as was described previously for clutch by-wire 106.

Although a limited number of clutch circuits were demonstrated in each of the demonstrated embodiment, it is obvious that each of the demonstrated embodiments will work with any number of clutch circuits arranged around, and equidistantly from, a predetermined rotational axis of the embodiment.

In addition to an ability to change a number of clutch circuits by arranging them around a predetermined axis of a single clutch by-wire, a total number of clutch circuits can be increased also by connecting a plurality of clutches by-wire to each other as a network of a predetermined configuration, wherein any clutch circuit of a parent clutch by-wire is utilized as a rotary source for at least one child clutch by-wire, where a single motor of the top clutch by-wire of the network hierarchy is sufficient for supplying rotary movement to any combination of clutch circuits of any number of the networked clutches by-wire.

Lastly, although gear trains were demonstrated as clutch circuits, any rotary trains known in the art may be used instead: for instance, instead of engaging gears, engaging disks by utilizing a traction force there between may be used for transfer of rotary movement.

Those who are skilled in the art will readily perceive how to modify the invention. Therefore, the appended claims are to be construed to cover all equivalent structures which fall within the scope and spirit of the invention.

What is claimed is:
1. A clutch by-wire comprising:
a) at least one rotary source for providing incoming rotary movement thereto according to a predetermined algorithm executable by a controller;

b) a plurality of clutch circuits arranged around, and equidistantly from, a predetermined axis, wherein each clutch circuit is a mechanical circuit for receiving said incoming rotary movement independently of the rest of said plurality of clutch circuits;

c) at least one actuating device controllable according to said algorithm and capable of rotating around said axis for aligning with any of said plurality of clutch circuits, each of said at least one actuating device is also capable of changing a selection status of any of said plurality of clutch circuits aligned therewith, wherein each of said plurality of clutch circuits is preconfigured for receiving said incoming rotary movement when selected and for not receiving said incoming rotary movement when deselected, thereby a desired number of the clutch circuits is achievable by arranging thereof equidistantly around said axis, wherein a single actuating device is sufficient for distributing said incoming rotary movement to any of the clutch circuits regardless of a number of the clutch circuits.

2. The clutch by-wire of claim 1, wherein each of said plurality of clutch circuits is further preconfigured for remaining in said selection status after each change by said at least one actuating device, thereby a single actuating device is also sufficient for selecting any combination of the clutch circuits regardless of a number thereof for receiving said incoming rotary movement simultaneously.

3. The clutch by-wire of claim 1, wherein said algorithm is further predetermined for controlling a network of clutches by-wire connected with each other such that at least one of the clutch circuits of at least one source clutch by-wire is capable of being utilized as one of said at least one rotary source of a recipient clutch by-wire, thereby a desired number of the clutch circuits is also achievable by utilizing said network, wherein a single independent rotary source is sufficient for distributing rotary movement throughout said network.

4. The clutch by-wire of claim 1, wherein each of said at least one actuating device is further capable of engaging with, and disengaging from, said at least one rotary source, wherein said algorithm is further for engaging any of said at least one actuating device with said at least one rotary source for rotating each engaged actuating device around said axis by said incoming rotary movement, said algorithm is also for disengaging any of said at least one actuating device from said at least one rotary source for preventing each disengaged actuating device from being rotated around said axis by said incoming rotary movement.

5. The clutch by-wire of claim 1, wherein each of said plurality of clutch circuits further comprises a clutch device for coupling with, and decoupling from, said at least one rotary source when said incoming rotary movement is present, thereby changing of said selection status by said at least one actuating device is achievable without stopping said at least one rotary source.

* * * * *